(12) United States Patent
Petersen et al.

(10) Patent No.: US 9,218,744 B2
(45) Date of Patent: Dec. 22, 2015

(54) SYSTEM AND METHOD FOR MANAGING AIRCRAFT GROUND OPERATIONS

(71) Applicant: General Electric Company, Schenectady, NY (US)

(72) Inventors: Jon David Petersen, Austin, TX (US); Srinivas Bollapragada, Niskayuna, NY (US); Weiwei Chen, New Brunswick, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 0 days.

(21) Appl. No.: 14/169,379

(22) Filed: Jan. 31, 2014

(65) Prior Publication Data

US 2015/0221225 A1    Aug. 6, 2015

(51) Int. Cl.
*G06Q 10/00* (2012.01)
*G08G 5/00* (2006.01)
*G08G 5/06* (2006.01)
*G06Q 10/04* (2012.01)

(52) U.S. Cl.
CPC .................. *G08G 5/06* (2013.01); *G06Q 10/04* (2013.01); *G08G 5/0095* (2013.01)

(58) Field of Classification Search
CPC ........ G06Q 10/04; G08G 5/0095; G08G 5/06
USPC ................. 701/120, 2, 10; 340/958
See application file for complete search history.

(56) References Cited

U.S. PATENT DOCUMENTS

| | | | |
|---|---|---|---|
| 6,161,097 A | 12/2000 | Glass et al. | |
| 6,314,361 B1 | 11/2001 | Yu et al. | |
| 6,408,276 B1 | 6/2002 | Yu et al. | |
| 7,333,887 B2 * | 2/2008 | Baiada et al. | 701/120 |
| 7,477,141 B2 * | 1/2009 | Roberts | 340/479 |
| 8,073,726 B1 | 12/2011 | Liu et al. | |
| 8,078,350 B2 | 12/2011 | Coulmeau | |
| 8,103,533 B2 | 1/2012 | Leslie | |
| 2003/0191678 A1 | 10/2003 | Shetty et al. | |
| 2005/0071076 A1 * | 3/2005 | Baiada et al. | 701/120 |

(Continued)

OTHER PUBLICATIONS

Lim et al., "Robust Airport Gate Assignment", Systems, Man and Cybernetics, 1995. ITools with Artificial Intelligence, 2005. ICTAI 05. 17th IEEE International Conference on, 8 pp.—81, Nov. 16, 2005.

(Continued)

*Primary Examiner* — Marthe Marc-Coleman
(74) *Attorney, Agent, or Firm* — Fletcher Yoder, P.C.

(57) ABSTRACT

A method for managing aircraft ground operations includes receiving an initial gate assignment schedule, an initial operational task schedule, and a current flight schedule. The method also includes determining a first adjusted gate assignment schedule based at least in part on the initial gate assignment schedule and the current flight schedule to reduce costs associated with reassigning aircraft to alternative gates. In addition, the method includes determining a first adjusted operational task schedule based at least in part on the initial operational task schedule and the current flight schedule to reduce costs associated with reassigning ground crew members to alternative tasks. Furthermore, the method includes determining a second adjusted gate assignment schedule and a second adjusted operational task schedule based at least in part on the current flight schedule, the first adjusted gate assignment schedule, and the first adjusted operational task schedule.

19 Claims, 7 Drawing Sheets

(56) References Cited

U.S. PATENT DOCUMENTS

| | | |
|---|---|---|
| 2005/0090969 A1 | 4/2005 | Siok et al. |
| 2006/0294140 A1 | 12/2006 | Schemionek et al. |
| 2007/0156635 A1* | 7/2007 | Tatton et al. ................ 707/1 |
| 2008/0010005 A1* | 1/2008 | Small et al. ................ 701/120 |
| 2009/0006160 A1 | 1/2009 | Boegner |
| 2013/0013182 A1 | 1/2013 | Bertsimas et al. |
| 2014/0278615 A1* | 9/2014 | Ince et al. ................ 705/6 |

OTHER PUBLICATIONS

Shangyao et al., "Optimization of multiple objective gate assignments", Department of Civil Engineering, National Central University, Chungli 32054, Taiwan, ROC, vol. 35, Issue 5, pp. 413-432, Jun. 2001.

Ali et al., "Optimizing gate assignments at airport terminals", Department of Civil Engineering, University of Maryland, College Park, MD 20742, USA,vol. 32, Issue 6, pp. 437-454, Aug. 1998.

Ding et al., "The over-constrained airport gate assignment problem", Computers & Operations Research, vol. 37, n2, pp. 1867-1880, 2005.

Xu et al., "The airport gate assignment problem: mathematical model and a tabu search algorithm", Proceedings of the 34th Hawaii International Conference on System Sciences, 2001.

Bolat., "Procedures for providing robust gate assignments for arriving aircrafts", European Journal of Operational Research, vol. 120, n1,pp. 63-80, 2000.

Dorndorf., "Flight gate scheduling: State-of-the-art and recent developments",Omega, vol. 35, n3, pp. 326-334, 2007.

Cheng et al., "A knowledge-based airport gate assignment system integrated with mathematical programming", Computers & Industrial Engineering, vol. 32, n4, pp. 837-852, 1997.

R.S. Mangoubi and D.F.X. Mathaisel, "Optimizing gate assignments at airport terminals", Transportation Science, v19, n2, 1985, pp. 173-188.

H.D. Sherali and E.L. Brown, A quadratic partial assignment and packing model and algorithm for the airline gate assignment problem., in Quadratic Assignment and Related Problems., 1994, pp. 343-364.

D. Dowling, M. Krishnamoorthy, H. Mackenzie, D. Sier, "Staff rostering at a large international airport", Annals of Operations Research, v72, n0, 1997, pp. 125-147.

A.T. Ernst, H. Jiang, M. Krishnamoorthy, D. Sier, "Staff scheduling and rostering: A review of applications, methods, and models", European Journal of Operational Research, v153, n1, 2004, p. 3-27.

P. Eveborn and M. Ronnqvist,"Scheduler—A system for staff planning", Annals of Operations Research, v128, n1-4, 2004, pp. 21-45.

J. Herbers, Models and Algorithms for Ground Staff Scheduling on Airports, PhD Dissertation, Universitatbibliothek, 2005, pp. 1-275.

R. Stolletz, "Operational workforce planning for check-in counters at airports", Transportation Research Part E: Logistics and Transportation Review, v46, n3, 2010, pp. 414-425.

U. Dorndorf, "Staff and resource scheduling at airports", Operations Research Proceedings 2006, pp. 3-7.

\* cited by examiner

SYSTEM AND METHOD FOR MANAGING AIRCRAFT GROUND OPERATIONS

BACKGROUND

The subject matter disclosed herein relates to a system and method for managing aircraft ground operations.

Certain airports include multiple terminals configured to receive multiple aircraft. Each terminal may include multiple gates distributed about a periphery of the terminal and configured to receive respective aircraft. To facilitate efficient airport ground operations, a gate assignment schedule may be utilized to direct each aircraft to a desired gate. For example, the gate assignment schedule may include gate assignments for aircraft scheduled to arrive and depart from the airport during an operational time frame (e.g., a time frame associated with the duration of the schedule). Unfortunately, flight schedule variations for the aircraft scheduled to arrive and depart from the airport during the operational time frame may disrupt the gate assignment schedule. For example, if an aircraft arrives earlier than expected, the assigned gate may be occupied by another aircraft. As a result, the arriving aircraft may be reassigned to another gate or instructed to wait on a ramp until a suitable gate becomes available, thereby increasing airport/airline operating costs (e.g., costs associated with adjusting flight crew connections, costs associated with adjusting passenger connections, costs associated with adjusting cargo connections, etc.).

Furthermore, while an aircraft is parked at a gate, the aircraft may undergo turn activities to prepare the aircraft for a subsequent flight. Turn activities may include passenger services (e.g., deplaning passengers, loading passengers, bus transfers, etc.), baggage handling (e.g., unload baggage, loading baggage, etc.), cargo handling (e.g., unloading cargo, loading cargo, etc.), fueling operations, catering operations, and cabin cleaning, among others. To facilitate efficient airport ground operations, an operational task schedule may be utilized to organize the activities of ground crew members. For example, the operational task schedule may include task assignments for ground crew members scheduled to service aircraft during the operational time frame. Unfortunately, flight schedule variations for the aircraft scheduled to arrive and depart from the airport during the operational time frame may disrupt the operational task schedule. For example, if an aircraft arrives later than expected, ground crew members scheduled to service the aircraft may not be able to complete their assigned tasks. As a result, the ground crew members may remain idle until the aircraft arrives or may be reassigned to alternative tasks, thereby increasing airport/airline operating costs (e.g., costs associated with adjusting ground crew schedules, costs associated with utilizing additional ground crew members, costs associated with inefficient shift utilization, etc.).

BRIEF DESCRIPTION

In one embodiment, a method for managing aircraft ground operations includes receiving, via at least one processor, an initial gate assignment schedule. The initial gate assignment schedule includes gate assignments for aircraft scheduled to arrive and depart from an airport during an operational time frame. The method also includes receiving, via the at least one processor, an initial operational task schedule. The initial operational task schedule includes task assignments for ground crew members scheduled to service the aircraft during the operational time frame. In addition, the method includes receiving, via the at least one processor, a current flight schedule for the aircraft scheduled to arrive and depart from the airport during the operational time frame. The method further includes determining, via the at least one processor, a first adjusted gate assignment schedule based at least in part on the initial gate assignment schedule and the current flight schedule to reduce costs associated with reassigning the aircraft to alternative gates. The method includes determining, via the at least one processor, a first adjusted operational task schedule based at least in part on the initial operational task schedule and the current flight schedule to reduce costs associated with reassigning the ground crew members to alternative tasks. Furthermore, the method includes determining, via the at least one processor, a second adjusted gate assignment schedule and a second adjusted operational task schedule based at least in part on the current flight schedule, the first adjusted gate assignment schedule, and the first adjusted operational task schedule. The method also includes outputting the first adjusted gate assignment schedule, the first adjusted operational task schedule, the second adjusted gate assignment schedule, the second adjusted operational task schedule, or a combination thereof.

In another embodiment, an apparatus includes at least one non-transitory, tangible, machine-readable media having instructions encoded thereon for execution by a processor. The instructions include instructions to receive an initial gate assignment schedule. The initial gate assignment schedule includes gate assignments for aircraft scheduled to arrive and depart from an airport during an operational time frame. The instructions also include instructions to receive an initial operational task schedule. The initial operational task schedule includes task assignments for ground crew members scheduled to service the aircraft during the operational time frame. Furthermore, the instructions include instructions to receive a current flight schedule for the aircraft scheduled to arrive and depart from the airport during the operational time frame. The instructions include instructions to determine a first adjusted gate assignment schedule based at least in part on the initial gate assignment schedule and the current flight schedule to reduce costs associated with reassigning the aircraft to alternative gates. The instructions also include instructions to determine a first adjusted operational task schedule based at least in part on the initial operational task schedule and the current flight schedule to reduce costs associated with reassigning the ground crew members to alternative tasks. The instructions further include instructions to determine a second adjusted gate assignment schedule and a second adjusted operational task schedule based at least in part on the current flight schedule, the first adjusted gate assignment schedule, and the first adjusted operational task schedule.

In a further embodiment, a system for managing aircraft ground operations includes at least one processor configured to determine a first adjusted gate assignment schedule based at least in part on an initial gate assignment schedule and a current flight schedule to reduce costs associated with reassigning aircraft to alternative gates, to determine a first adjusted operational task schedule based at least in part on an initial operational task schedule and the current flight schedule to reduce costs associated with reassigning ground crew members to alternative tasks, and to determine a second adjusted gate assignment schedule and a second adjusted operational task schedule based at least in part on the current flight schedule, the first adjusted gate assignment schedule, and the first adjusted operational task schedule. The gate assignment schedules include gate assignments for the aircraft scheduled to arrive and depart from an airport during an operational time frame, and the operational task schedules include task assignments for the ground crew members scheduled to service the aircraft during the operational time frame.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
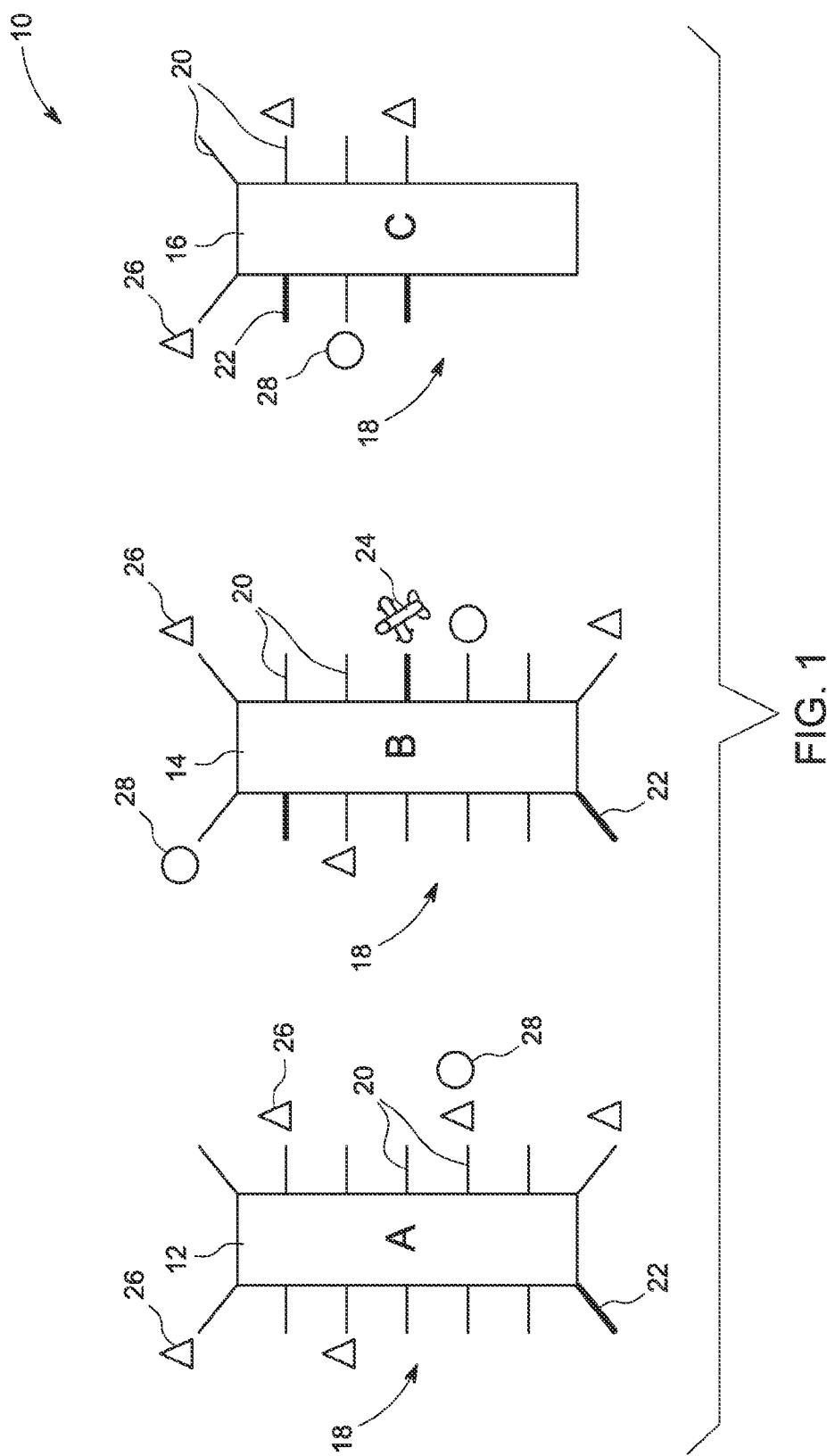
FIG. 1 is a schematic view of an embodiment of an airport having multiple terminals configured to receive multiple aircraft.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments disclosed herein may reduce costs associated with aircraft ground operations by integrating the determination of adjusted gate assignment schedules and adjusted operational task schedules. For example, in certain embodiments, a method for managing aircraft ground operations includes receiving an initial gate assignment, an initial operational task schedule, and a current flight schedule. Next, a first adjusted gate assignment schedule is determined based at least in part on the initial gate assignment schedule and the current flight schedule (e.g., via a mathematical programming solver/optimizer, an iterative/heuristic technique, etc.) to reduce costs associated with reassigning aircraft to alternative gates. In addition, a first adjusted operational task schedule is determined based at least in part on the initial operational task schedule and the current flight schedule (e.g., via a mathematical programming solver/optimizer, an iterative/heuristic technique, etc.) to reduce costs associated with reassigning ground crew members to alternative tasks.

A second adjusted gate assignment schedule and a second adjusted operational task schedule are then determined based at least in part on the current flight schedule, the first adjusted gate assignment schedule, and the first adjusted operational task schedule. For example, in certain embodiments, the second schedules are determined by a mathematical programming solver/optimizer, such as optimization software, configured to reduce the total costs associated with reassigning the aircraft to alternative gates and with reassigning the ground crew members to alternative tasks. In further embodiments, the second schedules are determined by iteratively adjusting the second adjusted gate assignment schedule and/or the second adjusted operational task schedule until a stopping condition is reached (e.g., until a sum of the costs associated with reassigning the aircraft to alternative gates and the costs associated with reassigning the ground crew members to alternative tasks is reduced below a threshold value, until the sum of the costs is reduced to an optimal value, until a variation in the sum of the costs between iterations is reduced below a threshold value, until a maximum runtime is reached, or until a maximum number of iterations is reached, etc.). By integrating the determination of the adjusted gate assignment schedule and the adjusted operational task schedule, aircraft ground operation costs associated with variations to a flight schedule may be substantially reduced. Accordingly, the method described herein may increase profitability of an airline and/or an airport, as compared to aircraft ground operation methods that independently determine adjusted gate assignment schedules and adjusted operational task schedules in response to flight schedule variations.

FIG. 1 is a schematic view of an embodiment of an airport 10 having multiple terminals configured to receive multiple aircraft. In the illustrated embodiment, the airport 10 includes a first terminal 12, designated terminal A, a second terminal 14, designated terminal B, and a third terminal 16, designated terminal C. While the illustrated airport 10 includes three terminals, it should be appreciated that alternative airports may include more or fewer terminals. For example, certain airports may include 1, 2, 3, 4, 5, 6, 7, 8, or more terminals.

In the illustrated embodiment, each terminal includes multiple gates 18 configured to receive multiple aircraft. As used herein, gate refers to an area in which a plane may be parked to facilitate turn activities, such as passenger services (e.g., deplaning passengers, loading passengers, etc.), baggage handling (e.g., unloading baggage, loading baggage, etc.), cargo handling (e.g., unloading cargo, loading cargo, etc.), fueling operations, catering operations, and cabin cleaning, among others. In certain embodiments, each gate may include a jetway or a jet bridge to establish a direct connection between the aircraft and a terminal building. In further embodiments, the gate may include a stand (e.g., a designated area of the airport) in which the plane may be parked remote from the terminal building. In such embodiments, passengers may be loaded and unloaded via a portable staircase or a stair car, and the passengers may walk to the terminal building or be transported to the terminal building by a bus or other vehicle.

As illustrated, the first terminal 12 and the second terminal 14 each include fourteen gates 18, and the third terminal 16 includes eight gates 18. However, it should be appreciated that each terminal may include more or fewer gates. For example, each terminal may include 2, 4, 6, 8, 10, 12, 14, 16, 18, 20, or more gates 18. During the course of airport operations, aircraft may be parked at certain gates, while other gates are available to receive incoming aircraft. In the illustrated embodiment, occupied gates 20 are designated with thin lines, while eligible gates 22 are designated with thick lines. An eligible gate 22 may be unoccupied and suitable to receive a particular incoming aircraft 24 (e.g., the gate may include a jetway capable of interfacing with the particular aircraft, the spacing between gates may accommodate the size of the particular aircraft, etc.).

During a planning phase (e.g., beginning about three weeks, about two weeks, about 1.5 weeks, about one week, about six days, about five days, about four days, about three days, about two days, or about one day before an operational time frame), an initial gate assignment schedule may be generated. The initial gate assignment schedule includes gate assignments for aircraft scheduled to arrive and depart from the airport 10 during the operational time frame. The initial gate assignment schedule may be determined based on scheduled passenger connections, scheduled flight crew connections, scheduled cargo connections, gate resource availability, and/or spatial considerations (e.g., the configuration of the gate, the spacing between gates, etc.), among other factors. For example, in the illustrated embodiment, the incoming aircraft 24 may be scheduled to arrive at a gate in terminal B based on the location of outbound aircraft 26 for passenger connections, as represented by triangles, and the location of outbound aircraft 28 for flight crew connections, as represented by circles. Accordingly, by positioning the incoming aircraft 24 at the desired gate in terminal B, each passenger and each flight crew member may have sufficient time to reach the connecting flight before the scheduled departure.

However, if the incoming aircraft 24 is delayed, or the flight schedule is otherwise disrupted, another aircraft may be assigned to the gate originally scheduled to receive the incoming aircraft 24. Accordingly, in certain embodiments, an aircraft ground operations management system may be utilized to adjust the gate assignment for the incoming aircraft 24, and for subsequent aircraft scheduled to arrive and depart from the airport during the operational time frame. In such embodiments, the aircraft ground operations management system is configured to receive an initial gate assignment schedule that includes gate assignments for aircraft scheduled to arrive and depart from the airport during the operational time frame. The aircraft ground operations management system is also configured to receive a current flight schedule for the aircraft scheduled to arrive and depart from the airport during the operational time frame. The aircraft ground operations management system is configured to determine an adjusted gate assignment schedule based at least in part on the initial gate assignment schedule and the current flight schedule to reduce costs associated with reassigning the aircraft to alternative gates. For example, the aircraft ground operations management system may assign the incoming aircraft 24, and other aircraft affected by the flight schedule variations, to respective gates that reduce costs associated with adjusting flight crew connections, costs associated with adjusting passenger connections, costs associated with adjusting cargo connections, and/or costs associated with adjusting turn activities (e.g., activities associated with preparing aircraft for subsequent flights).

Figure 2:
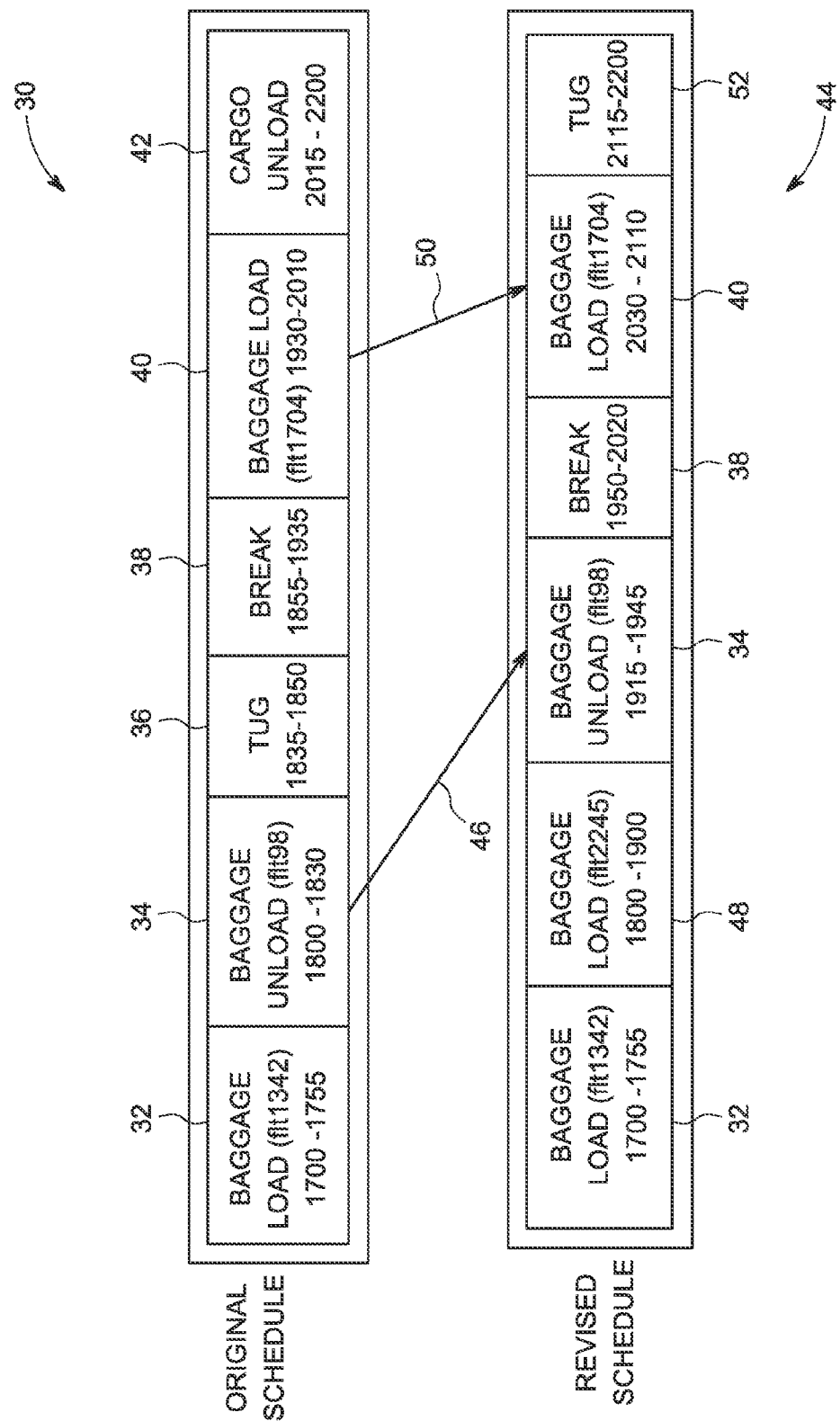
FIG. 2 is a process flow diagram of an embodiment of a task assignment schedule for a ground crew member.

FIG. 2 is a process flow diagram of an embodiment of a task assignment schedule 30 for a ground crew member. While an aircraft is parked at a gate, the aircraft may undergo turn activities to prepare the aircraft for a subsequent flight. Turn activities may include passenger services (e.g., deplaning passengers, loading passengers, etc.), baggage handling (e.g., unloading baggage, loading baggage, etc.), cargo handling (e.g., unloading cargo, loading cargo, etc.), fueling operations, catering operations, and cabin cleaning, among others. To facilitate efficient aircraft ground operations, an operational task schedule may be utilized to organize the activities of ground crew members. For example, the operational task schedule may include task assignments for ground crew members scheduled to service the aircraft during the operational time frame.

In certain embodiments, each member of the ground crew receives a respective task assignment schedule (e.g., a task assignment schedule for passenger services, a task assignment schedule for baggage handling, a task assignment schedule for cargo handling, a task assignment schedule for fueling operations, a task assignment schedule for catering operations, a task assignment schedule for cabin cleaning, etc.) via a production environment, which may include a display, a printer, and/or a portable electronic device. As illustrated, the task assignment schedule 30 for a baggage/cargo handler includes a first task 32 of loading baggage for flight 1342, a second task 34 of unloading baggage for flight 98, a third task 36 of operating a tug, followed by a break 38, a fourth task 40 of loading baggage for flight 1704, and a fifth task of unloading cargo 42. The first task 32 is schedule between 1700 and 1755, the second task 34 is scheduled between 1800 and 1830, the third task 36 is scheduled between 1835 and 1850, the break 38 is scheduled between 1855 and 1925, the fourth task 40 is scheduled between 1930 and 2010, and the fifth task 42 is scheduled between 2015 and 2200. The task assignment schedule 30 is based on an expected flight schedule, which may be established during a planning time frame (e.g., one day, two days, three days, four days, or more prior to the operational time frame).

As discussed in detail below, if the flight schedule is disrupted (e.g., due to inclement weather, aircraft mechanical problems, flight schedule disruptions at another airport, etc.), the aircraft ground operations management system is configured to adjust the operational task schedule based at least in part on the initial operational task schedule and the current flight schedule to reduce costs associated with reassigning ground crew members to alternative tasks. Accordingly, an adjusted operational task schedule is generated that includes task assignment schedules for each ground crew member scheduled to service the aircraft during the operational time frame. For example, in the illustrated embodiment, an adjusted/revised task assignment schedule 44 for the baggage/cargo handler is adjusted based on a delayed arrival of flight 98. As illustrated by arrow 46, the second task 34 is delayed until 1915 to accommodate the late arrival of flight 98. Accordingly, another task 48, i.e., loading baggage for flight 2245, is added to the schedule by the aircraft ground operations management system, such that the baggage/cargo handler is not idle while waiting for flight 98 to arrive. By adding the addition task, the aircraft ground operations management system increasing utilization of the baggage/cargo handler, thereby reducing costs associated with the disruption of the flight schedule.

Furthermore, the third task 36 and the fifth task 42 are canceled or reassigned, and as illustrated by the arrow 50, the fourth task 40 is delayed until 2030. In certain embodiments, the third and fifth tasks may be reassigned to another baggage/cargo handler (e.g., by adjusting the task assignment schedule for the other baggage/cargo handler). Furthermore, another additional task 52 is added to the adjusted/revised task assignment schedule 44 to efficiently utilize the ground crew member. As will be appreciated, the task assignment schedules for other ground crew members may also be adjusted based on the delayed flight to reduce costs associated with the disruption to the flight schedule. Moreover, while the operational task schedule is adjusted based on a disruption to the flight schedule, it should be appreciated that the operational task schedule may also be adjusted based at least in part on task coverage information, shift rule information, ground crew eligibility information, or a combination thereof.

Figure 3:
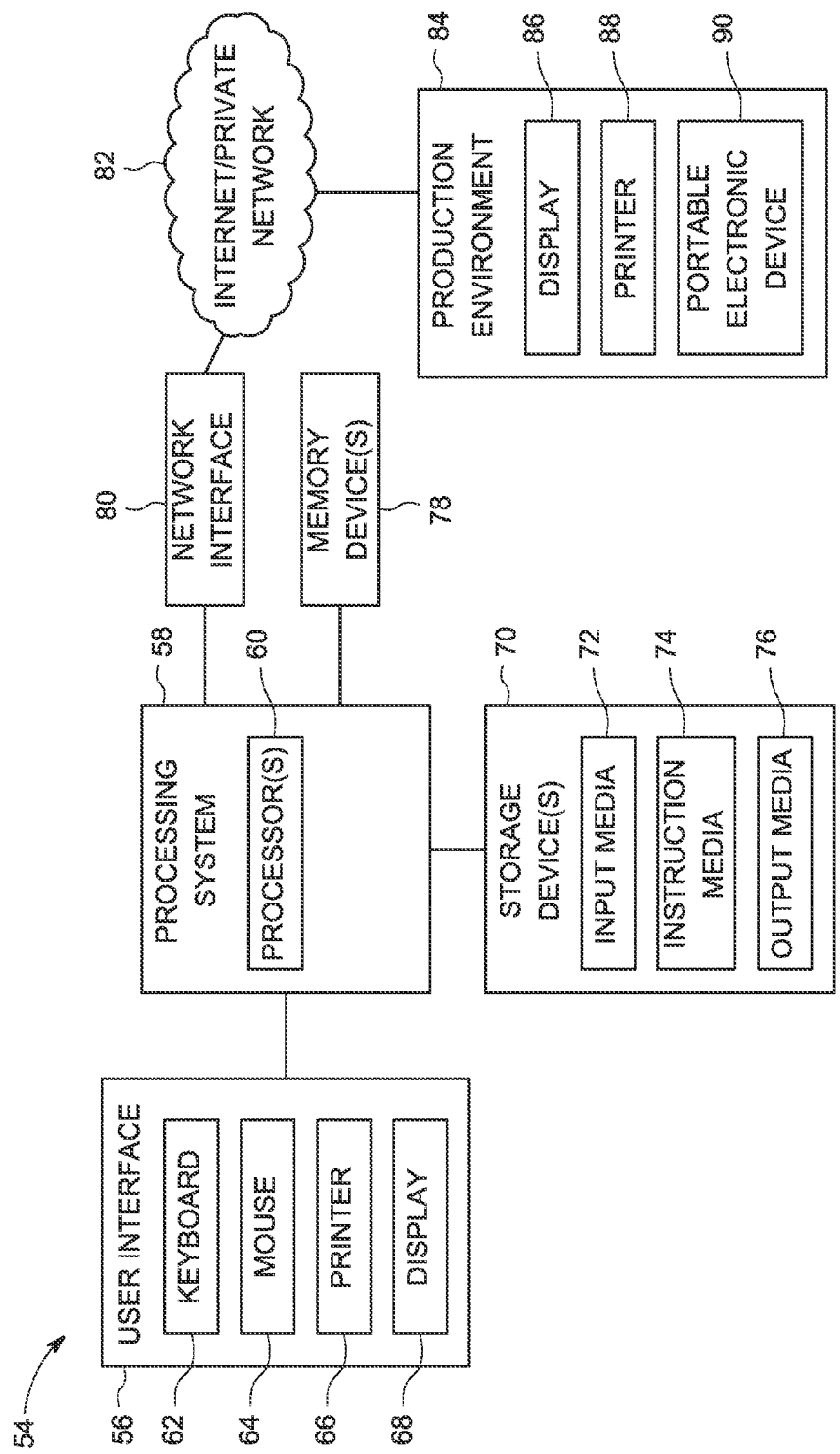
FIG. 3 is a block diagram of an embodiment of an aircraft ground operations management system.

FIG. 3 is a block diagram of an embodiment of an aircraft ground operations management system 54. As illustrated, the aircraft ground operations management system 54 includes a user interface 56 and a processing system 58. In certain embodiments, the processing system 58 is configured to determine an adjusted gate assignment schedule and an adjusted operational task schedule in response to flight schedule variations for aircraft scheduled to arrive and depart from an airport during an operational time frame. In the illustrated embodiment, the processing system 58 includes one or more processors 60, which may be used to execute software, such as gate assignment schedule determination software, operational task schedule determination software, and so forth. Moreover, the processor(s) 60 may include one or more microprocessors, such as one or more "general-purpose" microprocessors, one or more special-purpose microprocessors and/or application specific integrated circuits (ASICS), or some combination thereof. For example, the processor(s) 60 may include one or more reduced instruction set (RISC) processors.

As illustrated, the user interface 56 of the aircraft ground operations management system 54 includes multiple devices configured to enable an operator to provide input and receive output from the processing system 58. In the illustrated embodiment, the user interface 56 includes a keyboard 62 and a mouse 64 for inputting data, making selections, and/or operating the aircraft ground operations management system 54. Furthermore, the user interface 56 includes a printer 66 for printing data, such as for printing gate assignment schedules and/or operational task schedules. The user interface 56 also includes a display 68 to present visual data to an operator, such as data corresponding to gate assignment schedules and/or operational task schedules. While the illustrated embodiment includes a keyboard 62, a mouse 64, a printer 66, and a display 68, it should be appreciated that, in alternative embodiments, the user interface 56 may include more or fewer input and/or output devices.

In the illustrated embodiment, the aircraft ground operations management system 54 includes storage device(s) 70 (e.g., non-transitory storage media), such as read-only memory (ROM), flash memory, a hard drive, or any other suitable optical, magnetic, or solid-state storage medium, or a combination thereof. The storage device(s) 70 may store data (e.g., input data, output data, etc.), instructions (e.g., software or firmware for determining an adjusted gate assignment schedule, software or firmware for determining an adjusted operational task schedule, etc.), and any other suitable data. For example, in the illustrated embodiment, the storage device(s) 70 include input media 72, instruction media 74, and output media 76. The input media 72 may store data indicative of an initial gate assignment schedule, an initial operational task schedule, and/or a current flight schedule, among other data. In addition, the instruction media 74 may store data indicative of instructions for determining an adjusted gate assignment schedule, and/or instructions for determining an adjusted operational task schedule, among other data. The output media 76 may store data indicative of the adjusted gate assignment schedule and/or data indicative of the adjusted operational task schedule, among other data. While the illustrated storage device(s) 70 include input media, instruction media, and output media, it should be appreciated that, in certain embodiments, these media may be combined into one or two media, or separated into additional media (e.g., media for each input, media for each output, etc.). Furthermore, it should be appreciated that the storage device(s) may include additional media in alternative embodiments.

In the illustrated embodiment, the aircraft ground operations management system 54 includes memory device(s) 78 having volatile memory, such as random access memory (RAM), and/or nonvolatile memory, such as ROM. The memory device(s) 78 may store a variety of information and may be used for various purposes. For example, the memory device(s) 78 may store processor-executable instructions (e.g., firmware or software) for the processing system 58 to execute, such as instructions for an adjusted gate assignment schedule determination software, and/or instructions for an adjusted operational task schedule determination software.

Furthermore, in the illustrated embodiment, the aircraft ground operations management system 54 includes a network interface 80 configured to establish a data connection between the processing system 58 and a private network or the internet 82. The network interface 80 may utilize any suitable communication protocol, such as Ethernet or Wi-Fi, for example. In certain embodiments, the network interface 80 is configured to receive input data from a remote processing system, and/or the network interface 80 is configured to transmit output data to a remote processing system. For example, the network interface 80 may be configured to receive data indicative of an initial gate assignment schedule, an initial operational task schedule, and/or a current flight schedule, among other data (e.g., from a flight scheduling system, a remote user interface, etc.). In addition, the network interface 80 may be configured to transmit data indicative of an adjusted gate assignment schedule, and/or data indicative of an adjusted operational task schedule, among other data (e.g., to a flight scheduling system, to a remote user interface, etc.).

For example, in the illustrated embodiment, the network interface 80 is configured to output data to a production environment 84 via the network 82. The production environment 84 is configured to present an adjusted gate assignment schedule to flight crew members and/or to present an adjusted operational task schedule to ground crew members. In the illustrated embodiment, the production environment 84 includes a display 86, a printer 88, and a portable electronic device 90. The display 86 is configured to present visual and/or alphanumerical information to a user, such as flight crew members within an aircraft and/or ground crew members at a ground-based workstation. Similarly, the printer 88 is configured to create a printout of data indicative of an adjusted gate assignment schedule for flight crew members and/or a printout of data indicative of an adjusted operational task schedule for ground crew members. In certain embodiments, the flight crew members and/or the ground crew members may carry a portable electronic device 90 that presents a visual and/or an audible representation of an adjusted gate assignment schedule and/or an adjusted operational task schedule.

In certain embodiments, the processing system 58 is configured to integrally determine an adjusted gate assignment schedule and an adjusted operational task schedule to reduce costs associated with reassigning aircraft to alternative gates and with reassigning ground crew members to alternative tasks. In such embodiments, the processor(s) 60 are configured to determine a first adjusted gate assignment schedule based at least in part on an initial gate assignment schedule and a current flight schedule (e.g., from the user interface 56, from the input media 72, and/or from the network 82) to reduce costs associated with reassigning the aircraft to alternative gates. The processor(s) 60 are also configured to determine a first adjusted operational task schedule based at least in part on an initial operational task schedule and the current flight schedule (e.g., from the user interface 56, from the input media 72, and/or from the network 82) to reduce costs associated with reassigning the ground crew members to alternative tasks. In addition, the processor(s) 60 are configured to determine a second adjusted gate assignment schedule and a second adjusted operational task schedule based at least in part on the current flight schedule, the first adjusted gate assignment schedule, and the first adjusted operational task schedule. In certain embodiments, the processor(s) 60 are configured to output the first adjusted gate assignment schedule or the second adjusted gate assignment schedule to the production environment 84, and to output the first adjusted operational task schedule or the second adjusted operational task schedule to the production environment 84. The adjusted schedules may also be output to the user interface 56 and/or to the output media 76.

Figure 4:
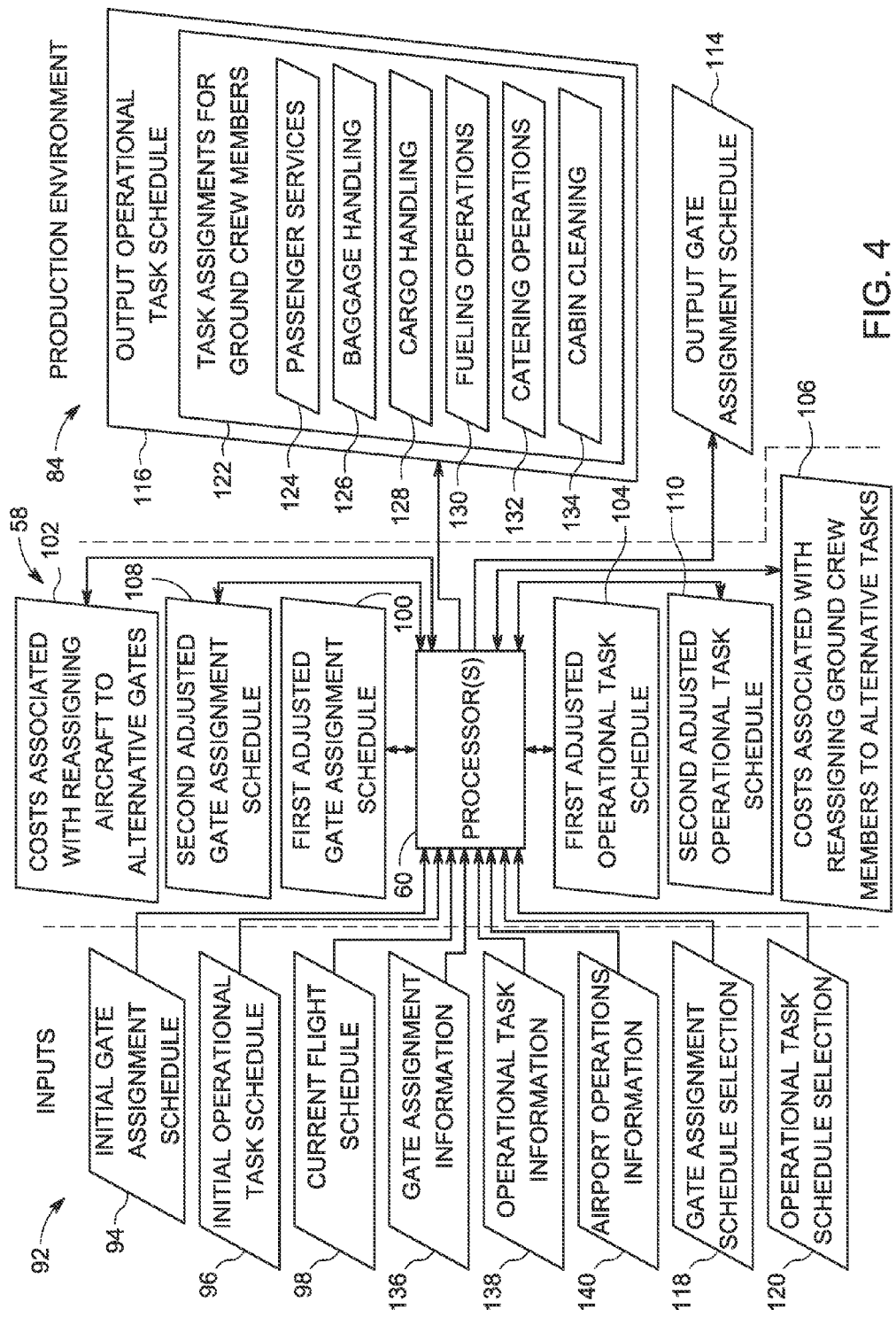
FIG. 4 is a block diagram of an embodiment of a processing system that may be employed within the aircraft ground operations management system of FIG. 3, in which the processing system is configured to determine an adjusted gate assignment schedule and an adjusted operational task schedule.

FIG. 4 is a block diagram of an embodiment of a processing system 58 that may be employed within the aircraft ground operations management system of FIG. 3, which is configured to determine an adjusted gate assignment schedule and an adjusted operational task schedule during an operational time frame. In certain embodiments, the operational time frame is defined by a user specification. In further embodiments, the operational time frame extends from the current operational time (e.g., the actual time on the day of operations) through the duration of a flight schedule, a gate assignment schedule, and/or an operational task schedule. By way of example, the flight schedule for aircraft scheduled to arrive and depart from an airport may extend one hour, two hours, four hours, eight hours, sixteen hours, one day, two days, three days, or more, from the current operational time. In certain embodiments, the duration of the gate assignment schedule and/or the operational task schedule may correspond to the duration of the flight schedule, thereby facilitating coordination of airport operations. During the operational time frame, the aircraft ground operations management system determines an adjusted gate assignment schedule and/or an adjusted operational task schedule in response to variations in the flight schedule to reduce costs associated with reassigning aircraft to alternative gates and/or with reassigning ground crew members to alternative tasks.

As illustrated, the processor(s) 60 of the processing system 58 are configured to receive multiple inputs 92 to facilitate determination of the adjusted gate assignment schedule and the adjusted operational task schedule. In the illustrated embodiment, the processor(s) 60 are configured to receive an initial gate assignment schedule 94, an initial operational task schedule 96, and a current flight schedule 98. The initial gate assignment schedule 94 includes gate assignments for aircraft schedule to arrive and depart from an airport during the operational time frame. For example, the initial gate assignment schedule 94 may include a mapping of aircraft to gates (e.g., flight 1342 is assigned to gate B8, flight 98 is assigned to gate B10, etc.), a scheduled arrival time for each aircraft, and a scheduled departure time for each aircraft. In certain embodiments, the initial gate assignment schedule 94 may include a listing of aircraft that are not assigned to a corresponding gate. In such embodiments, the processing system 58 may assign each aircraft to a gate during the operational time frame (e.g., via determination of an adjusted gate assignment schedule).

Furthermore, the initial operational task schedule 96 includes task assignments for ground crew members scheduled to service the aircraft during the operational time frame. For example, the task assignments may include passenger services (e.g., directing passengers to connecting flights, assisting passengers in deplaning, etc.), baggage handling (e.g., unloading and loading baggage onto the aircraft), cargo handling (e.g., unloading and loading cargo onto the aircraft), fueling operations (e.g., moving a fueling vehicle to the aircraft, fueling the aircraft from the fueling vehicle, etc.), catering operations (e.g., moving a catering vehicle to the aircraft, transporting food and drinks onto the aircraft, etc.), and cabin cleaning. Each task assignment may include a schedule of activities (e.g., similar to the task assignment schedules 30 and 44 of FIG. 2). In addition, the current flight schedule 98 includes scheduling information for the aircraft scheduled to arrive and depart from the airport during the operational time frame. For example, the flight schedule 98 may include a mapping of aircraft to gates, a scheduled arrival time for each aircraft, and a scheduled departure time for each aircraft.

Upon receiving the initial gate assignment schedule 94, the initial operational task schedule 96, and the current flight schedule 98, the processor(s) 60 determine a first adjusted gate assignment schedule 100 based at least in part on the initial gate assignment schedule 94 and the current flight schedule 98 to reduce costs associated with reassigning aircraft to alternative gates. For example, in certain embodiments, a mathematical programming solver/optimizer, such as optimization software executed by the processor(s) 60, may be utilized to determine a first adjusted gate assignment schedule 100 that reduces costs associated with reassigning the aircraft to alternative gates. In further embodiments, the processor(s) 60 may iteratively reassign each incoming aircraft to an available gate (e.g., from a list of available gates). After each iteration, the processor(s) 60 may determine the total costs associated with reassigning the aircraft to the alternative gates 102. For example, as discussed in detail below, the costs associated with reassigning the aircraft to the alternative gates may include costs associated with adjusting flight crew connections, costs associated with adjusting passenger connections, costs associated with adjusting cargo connections, costs associated with adjusting turn activities, or a combination thereof. The process of iteratively reassigning the incoming aircraft to the available gates may continue until a stopping condition is reached (e.g., until the costs associated with reassigning the aircraft to the alternative gates 102 are reduced below a threshold value, until the costs are reduced to an optimal value, until a variation in the costs between iterations is reduced below a threshold value, until a maximum runtime is reached, or until a maximum number of iterations is reached, etc.).

In certain embodiments, the processing system 58 may determine that the initial gate assignment schedule 94 is suitable for use in operation. For example, the costs associated with utilizing the initial gate assignment schedule 94 may be below a threshold value and/or less than an adjusted gate assignment schedule. In such embodiments, the processing system 58 may set the first adjusted gate assignment schedule 100 to the initial gate assignment schedule 94.

Once the first adjusted gate assignment schedule 100 is determined, the processor(s) 60 may determine a corresponding adjusted operational task schedule based at least in part on the first adjusted gate assignment schedule. For example, in certain embodiments, the processor(s) 60 may iteratively assign each ground crew member to a compatible task (e.g., a task that the ground crew member is qualified to perform) until complete task coverage is achieved (e.g., at least one ground crew member is assigned to perform each scheduled task), or until a maximum number of iterations or a maximum runtime is reached. If the maximum number of iterations or the maximum runtime is reached without complete task coverage, the processor(s) 60 may readjust the first adjusted gate assignment schedule, and then redetermine the corresponding adjusted operational task schedule. The process may repeat until a suitable corresponding adjusted operational task schedule is determined (e.g., until complete task coverage is achieved).

In the illustrated embodiment, the processor(s) are also configured to determine a first adjusted operational task schedule 104 based at least in part on the initial operational task schedule 96 and the current flight schedule 98 to reduce costs associated with reassigning ground crew members to alternative tasks. In certain embodiments, a mathematical programming solver/optimizer, such as optimization software executed by the processor(s) 60, may be utilized to determine a first adjusted operational task schedule 104 that reduces costs associated with reassigning the ground crew members to alternative tasks. In further embodiments, the processor(s) 60 are configured to iteratively reassign each ground crew member to a compatible task (e.g., a task that the ground crew member is qualified to perform). After each iteration, the processor(s) 60 may determine the total costs associated with reassigning each ground crew member to alternative tasks 106. For example, the costs associated with reassigning ground crew members to alternative tasks may include costs associated with adjusting ground crew schedules, costs associated with utilizing additional ground crew members, costs associated with inefficient shift utilization, or a combination thereof. The process of iteratively reassigning the ground crew members to the alternative tasks may continue until a stopping condition is reached (e.g., until the resulting costs 106 are reduced below a threshold value, until the resulting costs 106 are reduced to an optimal value, until a variation in the resulting costs 106 between iterations is reduced below a threshold value, until a maximum runtime is reached, or until a maximum number of iterations is reached, etc.).

In certain embodiments, the processing system 58 may determine that the initial operational task schedule 96 is suitable for use in operation. For example, the costs associated with utilizing the initial operational task schedule 96 may be below a threshold value and/or less than an adjusted operational task schedule. In such embodiments, the processing system 58 may set the first adjusted operational task schedule 104 to the initial operational task schedule 96.

Once the first adjusted operational task schedule 104 is determined, the processor(s) 60 may determine a corresponding adjusted gate assignment schedule based at least in part on the first adjusted operational task schedule. For example, in certain embodiments, the processor(s) 60 may iteratively assign each incoming aircraft to an available gate (e.g., from a list of available gates) until all aircraft scheduled to arrive and depart during the operational time frame have been assigned respective gates, or until a maximum number of iterations or a maximum runtime is reached. If the maximum number of iterations or the maximum runtime is reached without all aircraft being assigned respective gates, the processor(s) 60 may readjust the first adjusted operational task schedule, and then redetermine the corresponding adjusted gate assignment schedule. The process may repeat until a suitable corresponding adjusted gate assignment schedule is determined (e.g., until all aircraft have been assigned to respective gates).

In certain embodiments, the processing system 58 may receive a manually generated gate assignment schedule or a gate assignment schedule generated by another system. In further embodiments, the processing system 58 may be instructed (e.g., by an operator) to utilize the initial gate assignment schedule 94, or the processing system 58 may determine that the initial gate assignment schedule 94 is suitable for use in operation (e.g., the initial gate assignment schedule 94 is suitably cost effective). In such embodiments, the process of determining the corresponding adjusted gate assignment schedule includes setting the corresponding adjusted gate assignment schedule to the initial gate assignment schedule.

By determining the first adjusted gate assignment schedule and the first adjusted operational task schedule, the operator is provided with multiple scheduling options. Utilizing the first adjusted operational task schedule 104 and the corresponding adjusted gate assignment schedule reduces costs associated with reassigning ground crew members to alternative tasks, while utilizing the first adjusted gate assignment schedule 100 and the corresponding adjusted operational task schedule reduces costs associated with reassigning aircraft to alternative gates.

Once the first adjusted gate assignment schedule 100 and the first adjusted operational task schedule 104 are determined, the processor(s) 60 determine a second adjusted gate assignment schedule 108 and a second adjusted operational task schedule 110 based at least in part on the current flight schedule 98, the first adjusted gate assignment schedule 100, and the first adjusted operational task schedule 104. In certain embodiments, the second adjusted gate assignment schedule 108 and the second adjusted operational task schedule 110 are determined by a mathematical programming solver/optimizer, such as optimization software executed by the processor(s) 60, configured to reduce the total costs associated with reassigning the aircraft to alternative gates and with reassigning the ground crew members to alternative tasks. In further embodiments, the process of determining the second adjusted gate assignment schedule 108 and the second adjusted operational task schedule 110 involves an iterative/heuristic technique that includes setting the second adjusted gate assignment schedule 108 to the first adjusted gate assignment schedule 100, and setting the second adjusted operational task schedule 110 to the first adjusted operational task schedule 104. Next, the second adjusted gate assignment schedule 108 and/or the second adjusted operational task schedule 110 are iteratively adjusted until a stopping condition is reached. For example, in certain embodiments, the stopping condition may include a sum of the costs associated with reassigning the aircraft to alternative gates 102 and the costs associated with reassigning the ground crew members to alternative tasks 106 being reduced below a threshold value, the sum of the costs being reduced to an optimal value, a variation in the sum of the costs between iterations being reduced below a threshold value, a maximum runtime being reached, or a maximum number of iterations being reached, among others. Through each iteration, the second adjusted gate assignment schedule 108 and/or the second adjusted operational task schedule 110 are adjusted to accommodate one another and the current flight schedule 98 (e.g., to achieve feasible gate assignment and operational task schedules). For example, if a delayed flight is assigned to a particular gate, the operational task schedule is adjusted to facilitate turn activities at the particular gate.

In certain embodiments, the mathematical programming solver/optimizer may be utilized to determine the second adjusted gate assignment schedule 108 and the second adjusted operational task schedule 110 for less complex situations, such as situations involving fewer aircraft, fewer gates, fewer crew members, and so forth. Furthermore, the iterative/heuristic technique may be utilized to determine the second adjusted gate assignment schedule 108 and the second adjusted operational task schedule 110 for more complex situations, such as situations involving more aircraft, more gates, more crew members, and so forth. By way of example, the mathematical programming solver/optimizer may be initially utilized to determine the second schedules. However, if the mathematical programming solver/optimizer does not determine a second adjusted gate assignment schedule 108 and/or a second adjusted operational task schedule 110 that has desired characteristics (e.g., that reduce costs below a threshold value, that are compatible with one another, etc.), the iterative/heuristic technique may be employed.

Once the first and second adjusted gate assignment schedules and the first and second adjusted operational task schedules are determined, the processor(s) 60 output at least one gate assignment schedule 114 and at least one operational task schedule 116 to the production environment 84. For example, in certain embodiments, the processor(s) 60 are configured to receive a gate assignment schedule selection input 118 and an operational task schedule selection input 120. The gate assignment schedule selection input 118 instructs the processor(s) 60 to output the first adjusted gate assignment schedule and the corresponding adjusted operational task schedule, or the second adjusted gate assignment schedule and the second adjusted operational task schedule. In addition, the operational task schedule selection input 120 instructs the processor(s) 60 to output the first adjusted operational task schedule and the corresponding adjusted gate assignment schedule, or the second adjusted operational task schedule and the second adjusted gate assignment schedule. The gate assignment schedule selection input 118 and/or the operational task schedule selection input 120 may be received from the user interface 54, from the input media 72, and/or from the production environment 84. By way of example, an operator may instruct the processor(s) 60 to output the first adjusted gate assignment schedule and the corresponding adjusted operational task schedule via the gate assignment schedule selection input 118, or the operator may instruct the processor(s) 60 to output the first adjusted operational task schedule and the corresponding adjusted gate assignment schedule via the operational task schedule selection input 120. Alternatively, the operator may instruct the processor(s) 60 to output the second adjusted gate assignment schedule and the second adjusted operational task schedule via the gate assignment schedule selection input 118 or the operational task schedule selection input 120.

In alternative embodiments, the processor(s) 60 may be configured to output multiple gate assignment schedules and multiple operational task schedules to the production environment 84. For example, the processor(s) 60 may be configured to output the first adjusted gate assignment schedule, the corresponding adjusted operational task schedule, the first adjusted operational task schedule, the corresponding adjusted gate assignment schedule, the second adjusted gate assignment schedule, the second adjusted operational task schedule, or a combination thereof. An operator, after being presented with the schedules, may select the desired gate assignment schedule/operational task schedule that facilitates efficient aircraft ground operations. While the processor(s) 60 are configured to output the gate assignment schedule(s) 114 and the operational task schedule(s) 116 to the production environment 84 in the illustrated embodiment, it should be appreciated that the processor(s) 60 may also be configured to output the schedules to the user interface 56 and/or to the output media 72.

In certain embodiments, the processing system 58 is configured to receive input from the operator (e.g., via the user interface 56, the production environment 84, etc.) indicative of modifications to the gate assignment schedule and/or to the operational task schedule. For example, the operator may modify the first adjusted gate assignment schedule and/or the corresponding adjusted operational task schedule to facilitate determination of schedules that reduce costs associated with reassigning the aircraft to alternative gates and/or with reassigning the ground crew members to alternative tasks. By way of example, the operator may adjust the gate assignment schedule (e.g., by assigning one or more aircraft to respective ramps/holding areas instead of gates) such that the resultant corresponding adjusted operational task schedule reduces costs associated with reassigning the ground crew members to alternative tasks, and/or such that the first adjusted gate assignment schedule (e.g., determined after the iterative process) reduces costs associated with reassigning the aircraft to alternative gates. The process of determining the first adjusted gate assignment schedule and the corresponding adjusted operational task schedule is then repeated. If the cost reduction is less than desired and/or if the schedules are not acceptable to the operator, the operator may readjust the gate assignment schedule and/or the operational task schedule, and the process of determining the schedules may be repeated.

In addition, the operator may modify the first adjusted operational task schedule and/or the corresponding adjusted gate assignment schedule to facilitate determination of schedules that reduce costs associated with reassigning the aircraft to alternative gates and/or with reassigning the ground crew members to alternative tasks. The process of determining the first adjusted operational task schedule and the corresponding adjusted gate assignment schedule is then repeated. The operator may also modify the second adjusted gate assignment schedule and/or the second adjusted operational task schedule (e.g., to assign a particular aircraft to a desired gate, to assign a particular ground crew member to a desired task, etc.). The process of determining the second adjusted gate assignment schedule and the second adjusted operational task schedule is then repeated.

In the illustrated embodiment, the output operational task schedule 116 includes task assignments for ground crew members 122 (e.g., an individual task assignment schedule for each ground crew member). As illustrated, the task assignments include passenger services 124, baggage handling 126, cargo handling 128, fueling operations 130, catering operations 132, and cabin cleaning 134. Each task assignment may include a schedule of activities (e.g., similar to the task assignment schedules 30 and 44 of FIG. 2). As previously discussed, each task assignment schedule may be presented to a respective ground crew member via the production environment (e.g., via a portable electronic device, via a display, and/or via a printout).

In certain embodiments, the processor(s) 60 are configured to receive gate assignment information 136, operational task information 138, and/or airport operations information 140. The gate assignment information 136 may include gate availability information, flight crew connection information, passenger connection information, cargo connection information, or a combination thereof. The gate availability information may include a list of gates suitable to receive each aircraft. For example, the list may include gates that are currently unoccupied and are not scheduled to receive another aircraft within a desired time frame (e.g., corresponding to the turn time of the aircraft). In certain embodiments, the list of gates may be culled based on the suitability of each gate to receive an aircraft of a particular type. For example, certain gates may be unsuitable for receiving larger and/or heavier aircraft due to the configuration of the jetway and/or the spacing between gates. The processor(s) 60 may utilize the gate availability information to verify that each aircraft is matched to a suitable gate while determining the first and/or second adjusted gate assignment schedule. In addition, the flight crew connection information may include a list of gates at which aircraft associated with connecting flights for flight crew members are parked, and the departure schedule for the aircraft. The processor(s) 60 may utilize the flight crew connection information while determining costs associated with adjusting flight crew connections. Similarly, the passenger connection information may include a list of gates at which aircraft associated with subsequent passenger flights are parked, and the departure schedule for the aircraft. The processor(s) 60 may utilize the passenger connection information while determining costs associated with adjusting passenger connections. Furthermore, the cargo connection information may include a list of gates at which aircraft associated with subsequent cargo flights are parked, and the departure schedule for the aircraft. The processor(s) 60 may utilize the cargo connection information while determining costs associated with adjusting cargo connections.

The operational task information 138 may include task coverage information, shift rule information, ground crew eligibility information, or a combination thereof. The task coverage information may include a list of tasks associated with aircraft turn operations. For example, the task coverage information may include tasks associated with passenger services, baggage handling, cargo handling, fueling operations, catering operations, and cabin cleaning among others. The task coverage information enables the processor(s) 60 to assign a ground crew member to each task, such that all of the tasks associated with aircraft turn operations are completed. In addition, the shift rule information may include limitations on the workload for each ground crew member. For example, the limitations may include a maximum duration a ground crew member may work before taking a break, the maximum number of working hours within a 24-hour period, and/or the maximum number of working days within a week, among other limitations. The processor(s) 60 may utilize the shift rule information while determining the first and/or second adjusted operational task schedules to verify that the workload limitations are satisfied. Furthermore, ground crew eligibility information may include a list of tasks each ground crew member is qualified to perform. For example, certain crew members may be qualified to perform multiple tasks, such as passenger services and cabin cleaning. Such ground crew members may be assigned to different tasks during a shift to compensate for the unavailability of specialized ground crew members. The processor(s) 60 may utilize the ground crew eligibility information while determining the first and/or second adjusted operational task schedules to verify that each ground crew member is qualified to perform the assigned tasks.

The airport operations information 140 may include airport configuration information, airport disruption information, resource capability allocation information, or a combination thereof. The airport configuration information may include the number of terminals, the position and orientation of each terminal, the number of gates associated with each terminal, the position of each gate, the aircraft types each gate is configured to receive, and gate geometrical constraints (e.g., each of two adjacent gates may be capable of accommodating a large aircraft, but the spacing between gates is insufficient for both gates to accommodate large aircraft at the same time), among other information. The processor(s) 60 may utilize the airport configuration information to facilitate determination of available gates and/or to facilitate determination of costs associated with reassigning aircraft to alternative gates (e.g., by utilizing the distance between gates to estimate delays associated with transporting passengers, flight crew members, and/or cargo from the arrival gate to the gates of respective connecting flights). In addition, the airport disruption information may include a list of closed gates (e.g., due to maintenance operations, canceled flights, etc.), and/or a list of any factors that may delay ground crew members from moving between gates (e.g., inclement weather, unexpectedly high aircraft traffic, etc.). The processor(s) 60 may utilize the airport disruption information while adjusting the gate assignment schedule to verify that each aircraft is directed to a suitable gate, and/or while adjusting the operational task schedule to verify that each crew member has sufficient time to reach the location of a subsequent task before the start time of the task. Furthermore, the resource capability allocation information may include a list of available resources within the airport. For example, the number and location of baggage transportation vehicles, the number and location of cargo transportation vehicle, the number and location of fueling trucks, and/or the number and location of catering vehicle, among other resources. The processor(s) 60 may utilize the resource capability allocation information while adjusting the operational task schedule to verify that sufficient resources are available to complete the scheduled tasks.

Figure 5:
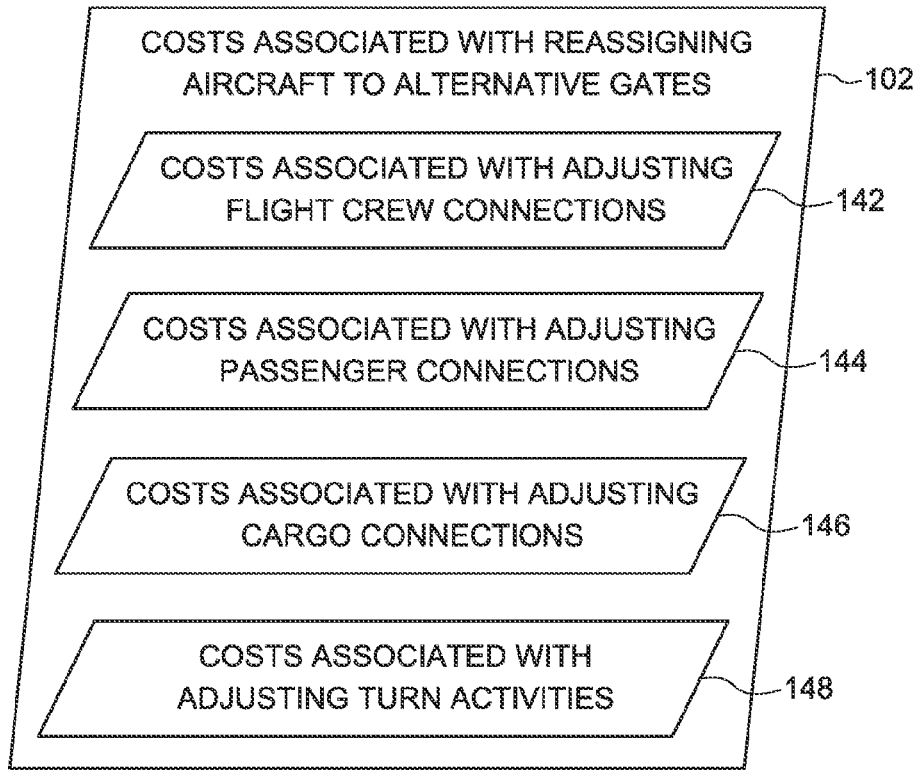
FIG. 5 is a block diagram of an embodiment of information corresponding to costs associated with reassigning aircraft to alternative gates.

FIG. 5 is a block diagram of an embodiment of information corresponding to costs associated with reassigning aircraft to alternative gates 102. In the illustrated embodiment, the costs associated with reassigning aircraft to alternative gates 102 includes costs associated with adjusting flight crew connections 142. For example, reassigning an aircraft to an alternative gate may result in delayed or missed connections for one or more flight crew members. By way of example, the initial gate assignment schedule may assign an aircraft to a gate in terminal A. In addition, a flight crew member may be scheduled to board a subsequent flight on an aircraft parked in another gate of terminal A. If the aircraft is reassigned to a gate in terminal C, the flight crew member may not have sufficient time to reach the subsequent flight before the scheduled departure time. Accordingly, the subsequent flight may be delayed or the flight crew member may be rerouted to the desired destination, thereby resulting in increased costs. For example, the costs may include recovery costs for the scheduled subsequent flight and/or recovery costs associated with the flight crew member (e.g., costs associated with placing the flight crew member on the alternative flight and/or costs associated with scheduling an alternative flight crew member to substitute for the delayed flight crew member, etc.), among other costs.

Furthermore, in the illustrated embodiment, the costs associated with reassigning aircraft to alternative gates 102 includes costs associated with adjusting passenger connections 144. For example, reassigning an aircraft to an alternative gate may result in delayed or missed connections for one or more passengers. By way of example, the initial gate assignment schedule may assign an aircraft to a gate in terminal A. In addition, a passenger may be scheduled to board a subsequent flight on an aircraft parked in another gate of terminal A. If the aircraft is reassigned to a gate in terminal C, the passenger may not have sufficient time to reach the subsequent flight before the scheduled departure time. Accordingly, the passenger may be rerouted to the desired destination, thereby resulting in costs associated with adjusting passenger connections. For example, the costs may include future lost ticket sales due to reduced passenger goodwill (e.g., the passenger may select an alternative airline for further flights), passenger accommodation costs associated with placing the passenger on the alternative flight (e.g., due to establishment of an overbooking situation), and/or costs associated with compensating the passenger for a delayed or missed connection, among other costs.

In certain embodiments, passenger value information may be considered in determining costs associated with adjusting passenger connections. For example, a passenger who frequently utilizes the airline for travel (e.g., who is a member of a frequent fliers club, etc.) may have a higher passenger value than a passenger who books a single trip with the airline. In addition, a passenger traveling in first class and/or business class may have a higher passenger value than a passenger traveling in coach. Accordingly, costs associated with adjusting passenger connections may be weighted based on the passenger value information to increase the likelihood that higher value passengers are able to reach the connecting flights prior to departure (e.g., which may provide the higher value passengers incentive to continue utilizing the airline).

In addition, in the illustrated embodiment, the costs associated with reassigning aircraft to alternative gates 102 includes costs associated with adjusting cargo connections 146. For example, reassigning an aircraft to an alternative gate may result in delayed or missed connections for one or more items of cargo. By way of example, the initial gate assignment schedule may assign an aircraft to a gate in terminal A. In addition, an item of cargo may be scheduled to be loaded onto a subsequent flight on an aircraft parked in another gate of terminal A. If the aircraft is reassigned to a gate in terminal C, the cargo handlers may not have sufficient time to transport the cargo to the subsequent flight before the scheduled departure time. Accordingly, the cargo may be rerouted to the desired destination, thereby resulting in costs associated with adjusting cargo connections. For example, the costs may include costs associated with loading the cargo onto the alternative flight (e.g., due to rerouting cargo and/or passengers of the alternative flight to provide sufficient storage volume and/or lifting capacity for the cargo), and/or costs associated with compensating the shipper for the delayed cargo, among other costs.

In certain embodiments, cargo value information may be considered in determining costs associated with adjusting cargo connections. For example, certain items may have higher priority due to the time-sensitive nature of the cargo (e.g., perishable goods, etc.) and/or the price paid by the shipper (e.g., the shipper may pay higher shipping costs for high priority cargo). Accordingly, costs associated with adjusting cargo connections may be weighted based on the cargo value information to increase the likelihood that higher priority cargo is able to reach the connecting flights prior to departure.

In the illustrated embodiment, the costs associated with reassigning aircraft to alternative gates 102 includes costs associated with adjusting turn activities 148. Turn activities involve preparing an aircraft for a subsequent flight, and may include unloading passengers, unloading baggage, unloading cargo, cleaning the cabin, receiving addition food and beverages (i.e., catering services), fueling the aircraft, loading passengers, loading baggage, and loading cargo, among other activities. If an aircraft is reassigned to an alternative gate, the turn activities may be adjusted to accommodate the new aircraft location. For example, cargo and baggage may be rerouted to the new aircraft location, a fuel truck may be rerouted to the new aircraft location, and/or a catering truck may be rerouted to the new aircraft location, among other adjustments to the turn activities. Rerouting the cargo, baggage, fuel, and catering vehicles to the new aircraft location may utilize additional fuel, delay the vehicles from servicing other aircraft, and/or disrupt the operational task schedule, thereby increasing airport operating costs.

In the illustrated embodiment, each of the costs associated with reassigning aircraft to alternative gates are added to one another to determine the total aircraft reassignment costs. Furthermore, while the costs associated with reassigning aircraft to alternative gates 102 include costs associated with adjusting flight crew connections, costs associated with adjusting passenger connections, costs associated with adjusting cargo connections, and costs associated with adjusting turn activities in the illustrated embodiment, it should be appreciated that alternative embodiments may include a subset of these costs. For example, in certain embodiments, the costs associated with reassigning aircraft to alternative gates may include one, two, or three of the costs included within the illustrated embodiment. In addition, it should be appreciated that in further embodiments, the costs associated with reassigning aircraft to alternative gates 102 may include additional costs, such as costs associated with aircraft operation (e.g., due to the increased distance traveled to the alternative gate), costs associated with adjusting aircraft maintenance schedules, and/or costs associated with additional gate fees, among other costs.

Figure 6:
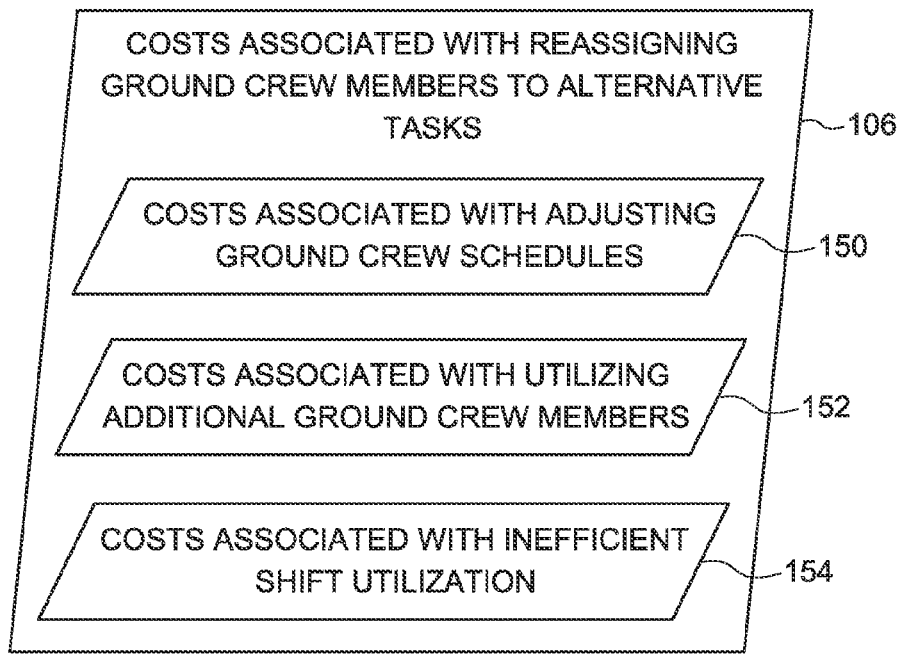
FIG. 6 is a block diagram of an embodiment of information corresponding to costs associated with reassigning ground crew members to alternative tasks.

FIG. 6 is a block diagram of an embodiment of information corresponding to costs associated with reassigning ground crew members to alternative tasks 106. In the illustrated embodiment, the costs associated with reassigning ground crew members to alternative tasks 106 includes costs associated with adjusting ground crew schedules 150. For example, if a flight is delayed, each ground crew member (e.g., baggage/cargo handler, cabin cleaner, catering provider, etc.) scheduled to service the aircraft may be reassigned to an alternative task. However, the location of the alternative task may be remote from the originally scheduled task. As a result, the ground crew members may be transported to the new location, thereby creating delays that may reduce the efficiency of aircraft ground operations and increase costs associated with reassigning ground crew members.

Furthermore, in the illustrated embodiment, the costs associated with reassigning ground crew members to alternative tasks 106 includes costs associated with utilizing additional ground crew members 152. In certain situations, variations to the flight schedule may result in an insufficient number of qualified ground crew members being on duty to perform each scheduled task. In such situations, additional ground crew members may be utilized to complete the tasks. However, the costs associated with providing the additional ground crew members may increase the total cost of aircraft ground operations. In addition, if the additional crew member(s) were not scheduled to work during the operational time frame, the crew member(s) may receive overtime pay, thereby further increasing costs associated with utilizing the additional crew member(s).

In the illustrated embodiment, the costs associated with reassigning ground crew members to alternative tasks 106 also includes costs associated with inefficient shift utilization 154. For example, if a flight is delayed (e.g., by an insufficient duration for ground crew members to begin a new task), each ground crew member (e.g., baggage/cargo handler, cabin cleaner, catering provider, etc.) scheduled to service the aircraft may be idle until the flight arrives. The time spent waiting for the aircraft to arrive increases costs associated with variations to the flight schedule by reducing efficiency of aircraft ground operations.

In the illustrated embodiment, each of the costs associated with reassigning ground crew members to alternative tasks are added to one another to determine the total ground crew reassignment costs. Furthermore, while the costs associated with reassigning ground crew members to alternative tasks include costs associated with adjusting ground crew schedules, costs associated with utilizing additional ground crew members, and costs associated with inefficient shift utilization in the illustrated embodiment, it should be appreciated that alternative embodiments may include a subset of these costs. For example, in certain embodiments, the costs associated with reassigning ground crew members to alternative tasks may include one or two of the costs included within the illustrated embodiment. In addition, it should be appreciated that in further embodiments, the costs associated with reassigning ground crew members to alternative tasks 106 may include additional costs, such as costs associated with dismissing on-duty ground crew members (e.g., if no suitable alternative tasks are available during a shift), costs associated with transporting ground crew members to alternative locations, and/or costs associated with additional ground crew supervision, among other costs.

Figure 7:
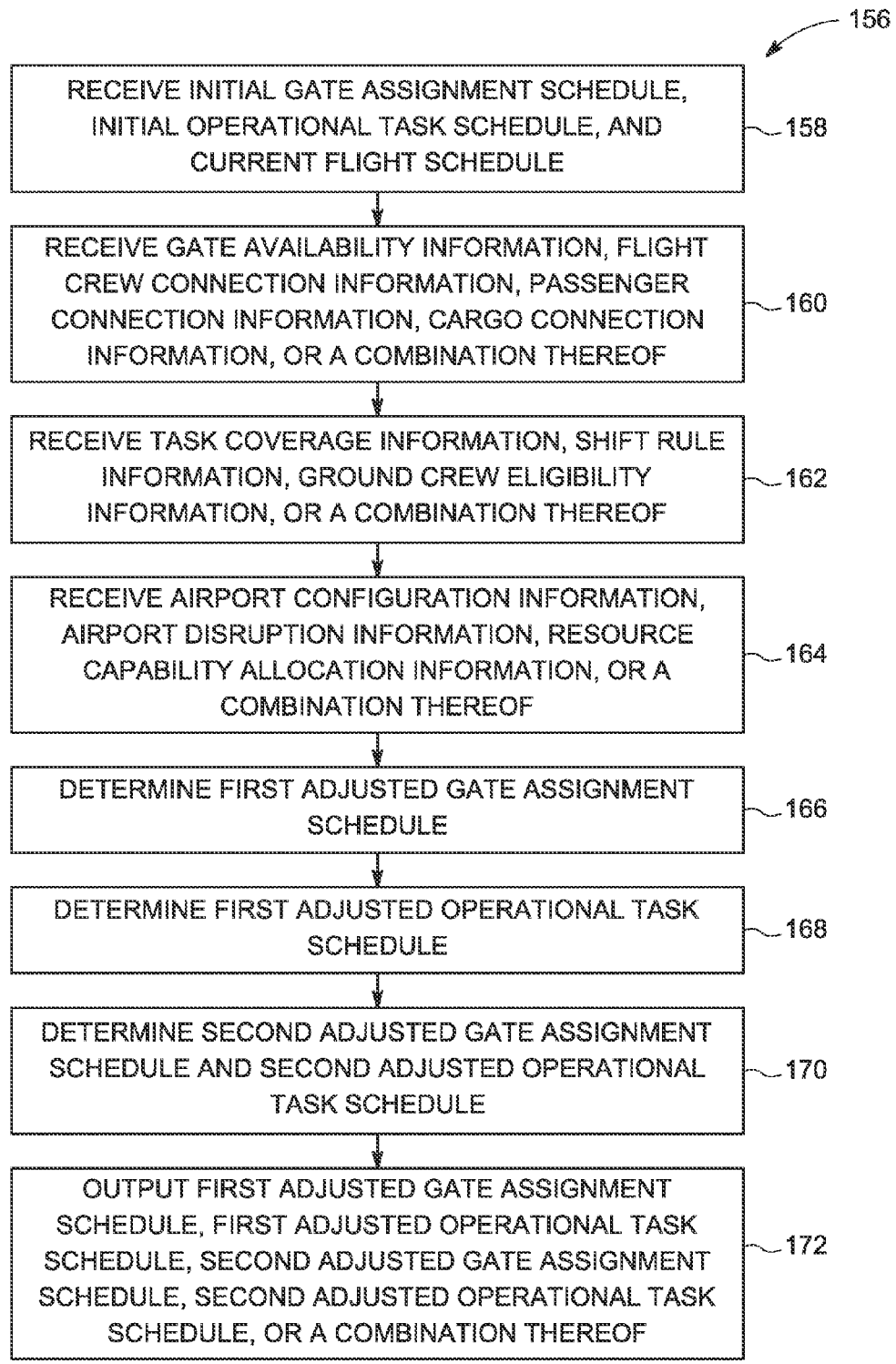
FIG. 7 is a flow diagram of an embodiment of a method for managing aircraft ground operations.

FIG. 7 is a flow diagram of an embodiment of a method 156 for managing aircraft ground operations. First, as represented by block 158, an initial gate assignment schedule, an initial operational task schedule, and a current flight schedule are received by processor(s) during an operational time frame. The initial gate assignment schedule includes gate assignments for aircraft scheduled to arrive and depart from an airport during the operational time frame. The initial operational task schedule includes task assignments for ground crew members scheduled to service the aircraft during the operational time frame. In addition, the current flight schedule includes scheduling information for the aircraft scheduled to arrive and depart from the airport during the operational time frame. Furthermore, as previously discussed, the operational time frame extends from the current operational time (e.g., the actual time on the day of operations) through the duration of the current flight schedule, the initial gate assignment schedule, and/or the initial operational task schedule.

Next, as represented by block 160, the gate availability information, flight crew connection information, passenger connection information, cargo connection information, or a combination thereof, is received by the processor(s). As previously discussed, the gate availability information may include a list of gates suitable to receive the aircraft (e.g., available gates that can accommodate the aircraft type). In addition, the flight crew connection information may include a list of gates at which aircraft associated with subsequent flight crew flights are parked, and the departure schedule for the aircraft. Similarly, the passenger connection information may include a list of gates at which aircraft associated with subsequent passenger flights are parked, and the departure schedule for the aircraft. Furthermore, the cargo connection information may include a list of gates at which aircraft associated with subsequent cargo flights are parked, and the departure schedule for the aircraft.

In addition, task coverage information, shift rule information, ground crew eligibility information, or a combination thereof, is received by the processor(s), as represented by block 162. As previously discussed, the task coverage information may include a list of tasks associated with aircraft turn operations (e.g., tasks associated with passenger services, baggage handling, cargo handling, fueling operations, catering operations, and cabin cleaning, among others). In addition, the shift rule information may include limitations on the workload for each ground crew member (e.g., the maximum duration a ground crew member may work before taking a break, the maximum number of working hours within a 24-hour period, and/or the maximum number of working days within a week, among other limitations). Furthermore, ground crew eligibility information may include a list of tasks each ground crew member is qualified to perform.

Furthermore, as represented by block 164, airport configuration information, airport disruption information, resource capability allocation information, or a combination thereof, is received by the processor(s). As previously discussed, the airport configuration information may include the number of terminals, the position and orientation of each terminal, the number of gates associated with each terminal, the position of each gate, and the aircraft types each gate is configured to receive, among other information. In addition, the airport disruption information may include a list of closed gates (e.g., due to maintenance operations, canceled flights, etc.), and/or a list of any factors that may delay ground crew members from moving between gates (e.g., inclement weather, unexpectedly high aircraft traffic, etc.). Furthermore, the resource capability allocation information may include a list of available resources within the airport (e.g., the number and location of baggage transportation vehicles, the number and location of cargo transportation vehicle, the number and location of fueling trucks, and/or the number and location of catering vehicle, among other resources).

Once the information is received, the processor(s) determine a first adjusted gate assignment schedule based at least in part on the initial gate assignment schedule and the current flight schedule to reduce costs associated with reassigning aircraft to alternative gates, as represented by block 166. For example, in certain embodiments, a mathematical programming solver/optimizer, such as optimization software executed by the processor(s), may be utilized to determine the first adjusted gate assignment schedule based at least in part on the gate availability information, the flight crew connection information, the passenger connection information, the cargo connection information, or a combination thereof. In further embodiments, for the aircraft of each disrupted flight, the processor(s) may determine a list of available gates based at least in part on the gate availability information. The processor(s) may then iteratively reassign the aircraft of each disrupted flight to an available gate (e.g., from the list of available gates for each aircraft). After each iteration, the processor(s) may determine the total costs associated with reassigning the aircraft to the alternative gates based at least in part on the flight crew connection information, the passenger connection information, the cargo connection information, or a combination thereof. For example, the costs associated with reassigning the aircraft to alternative gates may include costs associated with adjusting flight crew connections, costs associated with adjusting passenger connections, costs associated with adjusting cargo connections, costs associated with adjusting turn activities, or a combination thereof. The first adjusted gate assignment schedule may correspond to a mapping of aircraft to gates that reduces the costs of reassigning the aircraft.

Next, as represented by block 168, the processor(s) determines a first adjusted operational task schedule based at least in part on the initial operational task schedule and the current flight schedule to reduce costs associated with reassigning ground crew members to alternative tasks. For example, in certain embodiments, a mathematical programming solver/optimizer, such as optimization software executed by the processor(s), may be utilized to determine the first adjusted operational task schedule based at least in part on the task coverage information, the shift rule information, the ground crew eligibility information, or a combination thereof. In further embodiments, the processor(s) may determine a list of tasks associated with aircraft turn operations based at least in part on the task coverage information. The processor(s) may then iteratively reassign each ground crew member to a compatible task (e.g., a task that the ground crew member is qualified to perform) based at least in part on the shift rule information and/or the ground crew eligibility information. After each iteration, the processor(s) may determine the total costs associated with reassigning each ground crew member to alternative tasks. For example, the costs associated with reassigning ground crew members to alternative tasks may include costs associated with adjusting ground crew schedules, costs associated with utilizing additional ground crew members, costs associated with inefficient shift utilization, or a combination thereof. The first adjusted operational task schedule may correspond to a mapping of ground crew members to tasks that reduces the costs of reassigning the ground crew members.

Once the first adjusted gate assignment schedule and the first adjusted operational task schedule are determined, the processor(s) determine a second adjusted gate assignment schedule and a second adjusted operational task schedule based at least in part on the current flight schedule, the first adjusted gate assignment schedule, and the first adjusted operational task schedule, as represented by block 170. In certain embodiments, the second adjusted gate assignment schedule and the second adjusted operational task schedule are determined by a mathematical programming solver/optimizer, such as optimization software executed by the processor(s), configured to reduce the total costs associated with reassigning the aircraft to alternative gates and with reassigning the ground crew members to alternative tasks. In further embodiments, the processor(s) determine the second adjusted gate assignment schedule and the second adjusted operational task schedule by setting the second adjusted gate assignment schedule to the first adjusted gate assignment schedule, and setting the second adjusted operational task schedule to the first adjusted operational task schedule. Next, the second adjusted gate assignment schedule and/or the second adjusted operational task schedule are iteratively adjusted until a stopping condition is reached (e.g., until a sum of the costs associated with reassigning the aircraft to alternative gates and the costs associated with reassigning the ground crew members to alternative tasks is reduced below a threshold value, until the sum of the costs is reduced to an optimal value, until a variation in the sum of the costs between iterations is reduced below a threshold value, until a maximum runtime is reached, or until a maximum number of iterations is reached, etc.). As represented by block 172, the first adjusted gate assignment schedule, the first adjusted operational task schedule, the second adjusted gate assignment schedule, the second adjusted operational task schedule, or a combination thereof, is output (e.g., to the production environment).

Figure 8:
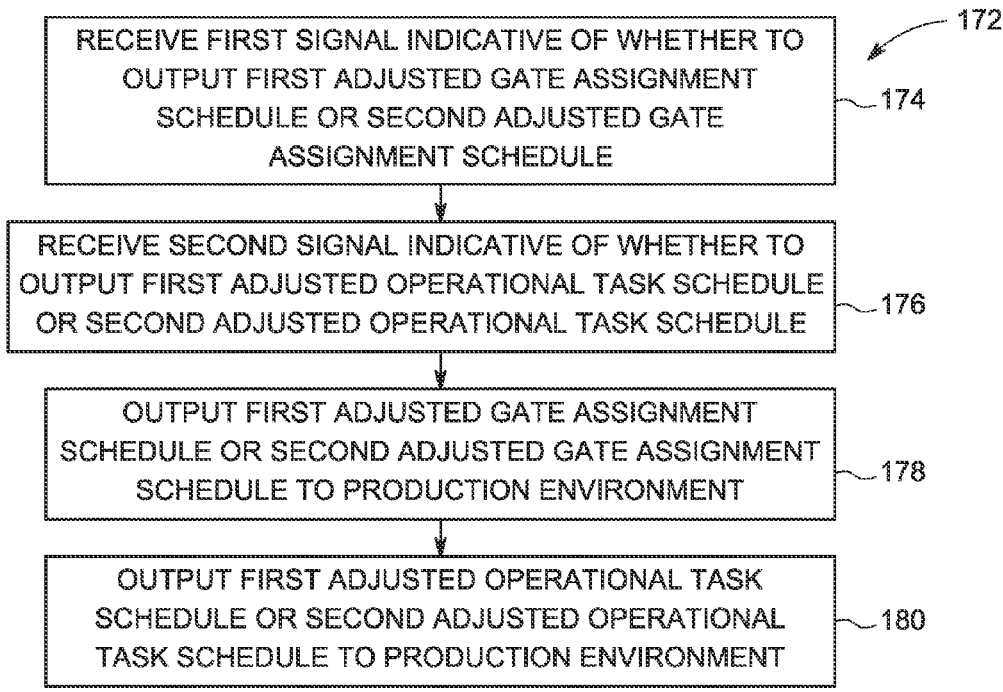
FIG. 8 is a flow diagram of an embodiment of a method for outputting an adjusted gate assignment schedule and an adjusted operational task schedule.

FIG. 8 is a flow diagram of an embodiment of a method 172 for outputting an adjusted gate assignment schedule and an adjusted operational task schedule. First, as represented by block 174, a first signal indicative of whether to output the first adjusted gate assignment schedule or the second adjusted gate assignment schedule is received from a user interface (e.g., the user interface 56 of the aircraft ground operations management system 54, a user interface within the production environment 84, etc.). In addition, a second signal indicative of whether to output the first adjusted operational task schedule or the second adjusted operational task schedule is received from the user interface (e.g., the user interface 56 of the aircraft ground operations management system 54, a user interface within the production environment 84, etc.), as represented by block 176. For example, if an operator desires to reduce costs associated with reassigning aircraft to alternative gates, the operator may select the first adjusted gate assignment. In addition, if an operator desires to reduce costs associated with reassigning ground crew members to alternative tasks, the operator may select the first adjusted operational task schedule. However, if the operator desires to reduce the total costs associated with reassigning aircraft to alternative gates and reassigning ground crew members to alternative tasks, the operator may select the second adjusted gate assignment schedule and the second adjusted operational task schedule.

As represented by block 178, the first adjusted gate assignment schedule or the second adjusted gate assignment schedule is output to the production environment based on the first signal. As previously discussed, the gate assignment schedule includes gate assignments for aircraft scheduled to arrive and depart from the airport during the operational time frame. The first adjusted operational task schedule or the second adjusted operational task schedule is then output to the production environment based on the second signal, as represented by block 180. As previously discussed, the operational task schedule includes task assignments for ground crew members scheduled to service the aircraft during the operational time frame. The production environment is configured to present the first or second adjusted gate assignment schedule to flight crew members and/or to present the first or second adjusted operational task schedule to ground crew members (e.g., via a display, a printer, a portable electronic device, etc.), thereby facilitating efficient aircraft ground operations.

Figure 9:
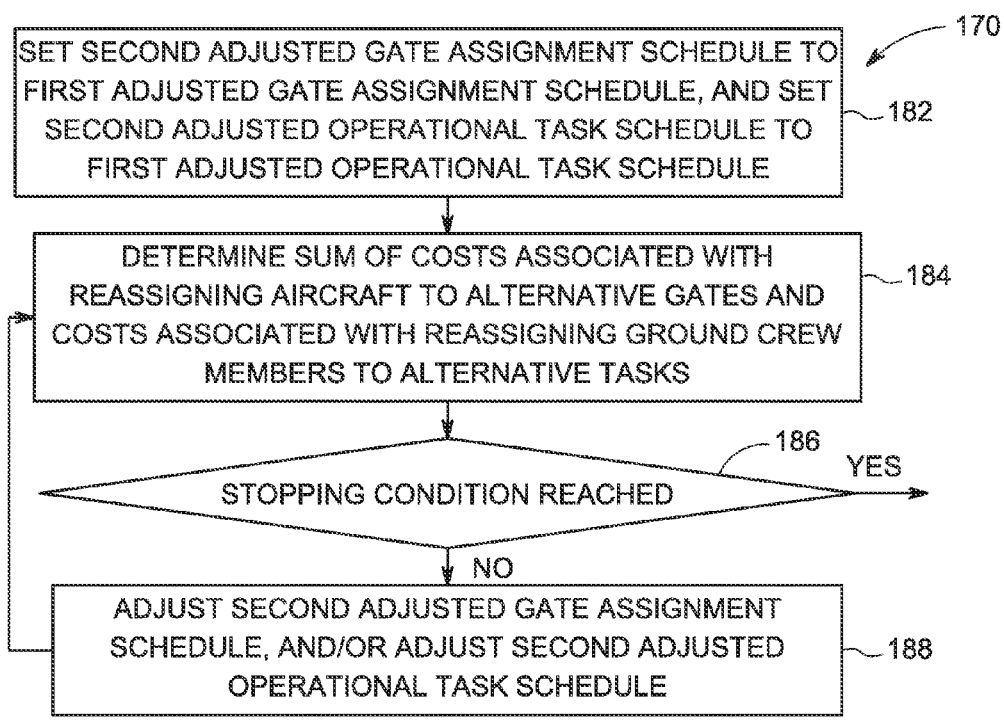
FIG. 9 is a flow diagram of an embodiment of a method for determining an adjusted gate assignment schedule and an adjusted operational task schedule.

FIG. 9 is a flow diagram of an embodiment of a method 170 for determining an adjusted gate assignment schedule and an adjusted operational task schedule. First, as represented by block 182, the second adjusted gate assignment schedule is set to the first adjusted gate assignment schedule, and the second adjusted operational task schedule is set to the first adjusted operational task schedule. Next, a sum of the costs associated with reassigning the aircraft to alternative gates and the costs associated with reassigning the ground crew members to alternative tasks is determined, as represented by block 184. For example, the costs associated with adjusting flight crew connections, the costs associated with adjusting passenger connections, the costs associated with adjusting cargo connections, the costs associated with adjusting turn activities, the costs associated with adjusting ground crew schedules, the costs associated with utilizing additional ground crew members, and/or the costs associated with inefficient shift utilization may be added to one another to determine the total costs.

As represented by block 186, a determination is made regarding whether a stopping condition is reached. In certain embodiments, the stopping condition corresponds to the sum of the costs being reduced below a threshold value. The threshold value, in turn, may correspond to a desired cost reduction, and may be selectable by an operator (e.g., via the user interface 56, via the input media 72, and/or via the production environment 84). In further embodiments, the stopping condition may correspond to the sum of the costs being reduced to an optimal value, or to a variation in the sum of the costs between iterations being reduced below a threshold value (e.g., indicating that the sum of the costs is approaching a desired value). In addition, the stopping condition may correspond to a maximum runtime being reached, a maximum number of iterations being reached, or another suitable stopping condition. If the stopping condition is reached, the first adjusted gate assignment schedule, the first adjusted operational task schedule, the second adjusted gate assignment schedule, the second adjusted operational task schedule, or a combination thereof, is output (e.g., in accordance with the method 172 described above). Otherwise, the second adjusted gate assignment schedule and/or the second adjusted operational task schedule are adjusted, as represented by block 188. The sum of the costs associated with reassigning the aircraft to alternative gates and the costs associated with reassigning the ground crew members to alternative tasks is then determined. The process repeats until the stopping condition is reached.

Technical effects include reducing costs associated with aircraft ground operations by integrating the determination of adjusted gate assignment schedules and adjusted operational task schedules. For example, an initial gate assignment, an initial operational task schedule, and a current flight schedule are received. Next, a first adjusted gate assignment schedule is determined based at least in part on the initial gate assignment schedule and the current flight schedule to reduce costs associated with reassigning aircraft to alternative gates. In addition, a first adjusted operational task schedule is determined based at least in part on the initial operational task schedule and the current flight schedule to reduce costs associated with reassigning ground crew members to alternative tasks. A second adjusted gate assignment schedule and a second adjusted operational task schedule are then determined based at least in part on the current flight schedule, the first adjusted gate assignment schedule, and the first adjusted operational task schedule. By integrating the determination of the adjusted gate assignment schedule and the adjusted operational task schedule, aircraft ground operation costs associated with variations to a flight schedule may be substantially reduced. Accordingly, the method described herein may increase profitability of an airline and/or an airport, as compared to aircraft ground operation methods that independently determine adjusted gate assignment schedules and adjusted operational task schedules in response to flight schedule variations.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A method for managing aircraft ground operations, comprising:
   receiving, via at least one processor, an initial gate assignment schedule, wherein the initial gate assignment schedule includes gate assignments for aircraft scheduled to arrive and depart from an airport during an operational time frame;
   receiving, via the at least one processor, an initial operational task schedule, wherein the initial operational task schedule includes task assignments for ground crew members scheduled to service the aircraft during the operational time frame;
   receiving, via the at least one processor, a current flight schedule for the aircraft scheduled to arrive and depart from the airport during the operational time frame;
   determining, in a first process step via the at least one processor, a first adjusted gate assignment schedule based at least in part on the initial gate assignment schedule and the current flight schedule to reduce costs associated with reassigning the aircraft to alternative gates;
   determining, in a second process step via the at least one processor, a first adjusted operational task schedule based at least in part on the initial operational task schedule and the current flight schedule to reduce costs associated with reassigning the ground crew members to alternative tasks;
   determining, in a third process step via the at least one processor, a second adjusted gate assignment schedule and a second adjusted operational task schedule based at least in part on the current flight schedule, the first adjusted gate assignment schedule, and the first adjusted operational task schedule; and
   outputting the first adjusted gate assignment schedule, the first adjusted operational task schedule, the second adjusted gate assignment schedule, the second adjusted operational task schedule, or a combination thereof, for visual representation on at least one display of a production environment.

2. The method of claim 1, comprising receiving, via the at least one processor, gate availability information, flight crew connection information, passenger connection information, cargo connection information, or a combination thereof, wherein determining the first adjusted gate assignment schedule, determining the second adjusted gate assignment schedule, or a combination thereof, is based at least in part on the gate availability information, the flight crew connection information, the passenger connection information, the cargo connection information, or a combination thereof.

3. The method of claim 1, comprising receiving, via the at least one processor, task coverage information, shift rule information, ground crew eligibility information, or a combination thereof, wherein determining the first adjusted operational task schedule, determining the second adjusted operational task schedule, or a combination thereof, is based at least in part on the task coverage information, the shift rule information, the ground crew eligibility information, or a combination thereof.

4. The method of claim 1, comprising receiving, via the at least one processor, airport configuration information, airport disruption information, resource capability allocation information, or a combination thereof, wherein determining the first adjusted gate assignment schedule, determining the second adjusted gate assignment schedule, determining the first adjusted operational task schedule, determining the second adjusted operational task schedule, or a combination thereof, is based at least in part on the airport configuration information, the airport disruption information, the resource capability allocation information, or a combination thereof.

5. The method of claim 1, wherein the task assignments for ground crew members include passenger services, baggage handling, cargo handling, fueling operations, catering operations, cabin cleaning, or a combination thereof.

6. The method of claim 1, wherein determining the second adjusted gate assignment schedule and the second adjusted operational task schedule comprises:
   setting the second adjusted gate assignment schedule to the first adjusted gate assignment schedule, and setting the second adjusted operational task schedule to the first adjusted operational task schedule; and
   iteratively adjusting the second adjusted gate assignment schedule, iteratively adjusting the second adjusted operational task schedule, or a combination thereof, until a stopping condition is reached.

7. The method of claim 6, wherein the stopping condition comprises a sum of the costs associated with reassigning the aircraft to the alternative gates and the costs associated with reassigning the ground crew members to the alternative tasks being reduced below a first threshold value, the sum of the costs being reduced to an optimal value, a variation in the sum of the costs between iterations being reduced below a second threshold value, a maximum runtime being reached, or a maximum number of iterations being reached.

8. The method of claim 1, wherein the costs associated with reassigning the aircraft to the alternative gates comprises costs associated with adjusting flight crew connections, costs associated with adjusting passenger connections, costs associated with adjusting cargo connections, costs associated with adjusting turn activities, or a combination thereof; and
   wherein the costs associated with reassigning the ground crew members to the alternative tasks comprises costs associated with adjusting ground crew schedules, costs associated with utilizing additional ground crew members, costs associated with inefficient shift utilization, or a combination thereof.

9. The method of claim 1, wherein outputting the first adjusted gate assignment schedule, the first adjusted operational task schedule, the second adjusted gate assignment schedule, the second adjusted operational task schedule, or the combination thereof, comprises outputting the first adjusted gate assignment schedule or the second adjusted gate assignment schedule to the at least one display of the production environment, and outputting the first adjusted operational task schedule or the second adjusted operational task schedule to the at least one display of the production environment;
   wherein the at least one display of the production environment is configured to present a first visual representation of the first or second adjusted gate assignment schedule to flight crew members, to present a second visual representation of the first or second adjusted operational task schedule to the ground crew members, or a combination thereof.

10. The method of claim 9, comprising receiving, via a user interface, a first signal indicative of whether to output the first adjusted gate assignment schedule or the second adjusted gate assignment schedule to the at least one display of the production environment, and receiving, via the user interface, a second signal indicative of whether to output the first adjusted operational task schedule or the second adjusted operational task schedule to the at least one display of the production environment.

11. An apparatus comprising:
   at least one non-transitory, tangible, machine-readable media having instructions encoded thereon for execution by a processor, the instructions comprising:
      instructions to receive an initial gate assignment schedule, wherein the initial gate assignment schedule includes gate assignments for aircraft scheduled to arrive and depart from an airport during an operational time frame;
      instructions to receive an initial operational task schedule, wherein the initial operational task schedule includes task assignments for ground crew members scheduled to service the aircraft during the operational time frame;
      instructions to receive a current flight schedule for the aircraft scheduled to arrive and depart from the airport during the operational time frame;
      instructions to determine a first adjusted gate assignment schedule based at least in part on the initial gate assignment schedule and the current flight schedule to reduce costs associated with reassigning the aircraft to alternative gates;
      instructions to determine a first adjusted operational task schedule based at least in part on the initial operational task schedule and the current flight schedule to reduce costs associated with reassigning the ground crew members to alternative tasks;
      instructions to determine a second adjusted gate assignment schedule and a second adjusted operational task schedule based at least in part on the current flight schedule, the first adjusted gate assignment schedule, and the first adjusted operational task schedule; and
      instructions to output the first adjusted gate assignment schedule, the first adjusted operational task schedule, the second adjusted gate assignment schedule, the second adjusted operational task schedule, or a combination thereof, for visual representation on at least one display of a production environment.

12. The apparatus of claim 11, wherein the instructions to output the first adjusted gate assignment schedule, the first adjusted operational task schedule, the second adjusted gate assignment schedule, the second adjusted operational task schedule, or the combination thereof, comprises instructions to output the first adjusted gate assignment schedule or the second adjusted gate assignment schedule to the at least one display of the production environment, and instructions to output the first adjusted operational task schedule or the second adjusted operational task schedule to the at least one display of the production environment;
   wherein the at least one display of the production environment is configured to present a first visual representation of the first or second adjusted gate assignment schedule to flight crew members, to present a second visual representation of the first or second adjusted operational task schedule to the ground crew members, or a combination thereof.

13. The apparatus of claim 11, wherein the costs associated with reassigning the aircraft to the alternative gates comprises costs associated with adjusting flight crew connections, costs associated with adjusting passenger connections, costs associated with adjusting cargo connections, costs associated with adjusting turn activities, or a combination thereof.

14. The apparatus of claim 11, wherein the costs associated with reassigning the ground crew members to the alternative tasks comprises costs associated with adjusting ground crew schedules, costs associated with utilizing additional ground crew members, costs associated with inefficient shift utilization, or a combination thereof.

15. The apparatus of claim 11, wherein the instructions to determine the second adjusted gate assignment schedule and the second adjusted operational task schedule comprise:
   instructions to set the second adjusted gate assignment schedule to the first adjusted gate assignment schedule, and to set the second adjusted operational task schedule to the first adjusted operational task schedule; and instructions to iteratively adjust the second adjusted gate assignment schedule, to iteratively adjust the second adjusted operational task schedule, or a combination thereof, until a stopping condition is reached.

16. A system for managing aircraft ground operations, comprising:

at least one processor configured to determine a first adjusted gate assignment schedule based at least in part on an initial gate assignment schedule and a current flight schedule to reduce costs associated with reassigning aircraft to alternative gates, to determine a first adjusted operational task schedule based at least in part on an initial operational task schedule and the current flight schedule to reduce costs associated with reassigning ground crew members to alternative tasks, and to determine a second adjusted gate assignment schedule and a second adjusted operational task schedule based at least in part on the current flight schedule, the first adjusted gate assignment schedule, and the first adjusted operational task schedule; and a production environment comprising at least one display configured to present a first visual representation of the first or second adjusted gate assignment schedule to flight crew members, to present a second visual representation of the first or second adjusted operational task schedule to the ground crew members, or a combination thereof, wherein the at least one processor is configured to output the first adjusted gate assignment schedule or the second adjusted gate assignment schedule to the at least one display of the production environment, to output the first adjusted operational task schedule or the second adjusted operational task schedule to the at least one display of the production environment, or a combination thereof;

wherein the gate assignment schedules include gate assignments for the aircraft scheduled to arrive and depart from an airport during an operational time frame, and the operational task schedules include task assignments for the ground crew members scheduled to service the aircraft during the operational time frame.

17. The system of claim 16, comprising a user interface configured to output a first signal indicative of whether to output the first adjusted gate assignment schedule or the second adjusted gate assignment schedule to the at least one display of the production environment, and to output a second signal indicative of whether to output the first adjusted operational task schedule or the second adjusted operational task schedule to the at least one display of the production environment.

18. The system of claim 16, wherein the task assignments for ground crew members include passenger services, baggage handling, cargo handling, fueling operations, catering operations, cabin cleaning, or a combination thereof.

19. The system of claim 16, wherein the at least one processor is configured to determine the second adjusted gate assignment schedule and the second adjusted operational task schedule by setting the second adjusted gate assignment schedule to the first adjusted gate assignment schedule, setting the second adjusted operational task schedule to the first adjusted operational task schedule, and iteratively adjusting the second adjusted gate assignment schedule, iteratively adjusting the second adjusted operational task schedule, or a combination thereof, until a stopping condition is reached.

* * * * *